US009942602B2

United States Patent
Petrovic et al.

(10) Patent No.: US 9,942,602 B2
(45) Date of Patent: Apr. 10, 2018

(54) WATERMARK DETECTION AND METADATA DELIVERY ASSOCIATED WITH A PRIMARY CONTENT

(71) Applicant: Verance Corporation, San Diego, CA (US)

(72) Inventors: Rade Petrovic, San Diego, CA (US); Jian Zhao, San Diego, CA (US); Joseph M. Winograd, San Diego, CA (US)

(73) Assignee: Verance Corporation, San Diego, CA (US)

( * ) Notice: Subject to any disclaimer, the term of this patent is extended or adjusted under 35 U.S.C. 154(b) by 219 days.

(21) Appl. No.: 14/951,302

(22) Filed: Nov. 24, 2015

(65) Prior Publication Data

US 2016/0148334 A1 May 26, 2016

Related U.S. Application Data

(60) Provisional application No. 62/084,465, filed on Nov. 25, 2014, provisional application No. 62/093,996, filed on Dec. 18, 2014.

(51) Int. Cl.
*G06K 9/00* (2006.01)
*H04N 21/435* (2011.01)
(Continued)

(52) U.S. Cl.
CPC ......... *H04N 21/435* (2013.01); *G10L 19/018* (2013.01); *H04N 21/2353* (2013.01); *H04N 21/4627* (2013.01); *H04N 21/8358* (2013.01)

(58) Field of Classification Search
None
See application file for complete search history.

(56) References Cited

U.S. PATENT DOCUMENTS 6,122,610 A 9/2000 Isabelle
6,145,081 A 11/2000 Winograd et al.
(Continued)

FOREIGN PATENT DOCUMENTS

EP 1474924 A2 11/2004
EP 2439735 A1 4/2012
(Continued)

OTHER PUBLICATIONS

International Search Report and Written Opinion dated Jan. 21, 2016 for International Application No. PCT/US2015/046166, filed Aug. 20, 2015 (8 pages).
(Continued)

*Primary Examiner* — Nirav G Patel
(74) *Attorney, Agent, or Firm* — Perkins Coie LLP; Donald L. Wenskay

(57) ABSTRACT

Methods, devices, systems and computer program products enable enhances delivery and use of metadata that is associated a primary multimedia content. Watermarks that are detected by a watermark extractor produce an indication as to a state of the watermark detector as being in one of a an unmarked content state, a marked content state or a gap state, and cause the watermark extractor to transition from one state to another state based on event that are recognized based a failure or a success in detecting watermarks, an indication of low content activity and a previous state of the watermark extractor. The events and states associated with the watermark extractor further allows retrieval of new metadata associated with the primary content, use of an existing metadata in a modified manner or a change in presentation of a secondary content that is associated with the primary content.

52 Claims, 11 Drawing Sheets

(51) Int. Cl.
  *G10L 19/018* (2013.01)
  *H04N 21/4627* (2011.01)
  *H04N 21/235* (2011.01)
  *H04N 21/8358* (2011.01)

(56) References Cited

U.S. PATENT DOCUMENTS

| | | |
|---|---|---|
| 6,175,627 B1 | 1/2001 | Petrovic et al. |
| 6,411,725 B1 | 6/2002 | Rhoads et al. |
| 6,427,012 B1 | 7/2002 | Petrovic |
| 6,430,301 B1 | 8/2002 | Petrovic |
| 6,490,579 B1 | 12/2002 | Gao et al. |
| 6,577,747 B1 | 6/2003 | Kalker et al. |
| 6,683,958 B2 | 1/2004 | Petrovic |
| 6,721,439 B1 | 4/2004 | Levy et al. |
| 6,792,542 B1 | 9/2004 | Lee et al. |
| 6,839,673 B1 | 1/2005 | Choi et al. |
| 6,888,943 B1 | 5/2005 | Lam et al. |
| 6,931,536 B2 | 8/2005 | Hollar |
| 7,024,018 B2 | 4/2006 | Petrovic |
| 7,140,043 B2 | 11/2006 | Choi et al. |
| 7,159,118 B2 | 1/2007 | Petrovic |
| 7,224,819 B2 | 5/2007 | Levy et al. |
| 7,343,397 B2 | 3/2008 | Kochanski |
| 7,460,667 B2 | 12/2008 | Lee et al. |
| 7,533,266 B2 | 5/2009 | Bruekers et al. |
| 7,548,565 B2 | 6/2009 | Sull et al. |
| 7,707,422 B2 | 4/2010 | Shin et al. |
| 7,774,834 B1 | 8/2010 | Chauhan et al. |
| 7,779,271 B2 | 8/2010 | Langelaar |
| 7,983,922 B2 | 7/2011 | Neusinger et al. |
| 7,986,806 B2 | 7/2011 | Rhoads |
| 7,991,995 B2 | 8/2011 | Rabin et al. |
| 8,005,258 B2 | 8/2011 | Petrovic et al. |
| 8,015,410 B2 | 9/2011 | Pelly et al. |
| 8,055,013 B2 | 11/2011 | Levy et al. |
| 8,059,815 B2 | 11/2011 | Lofgren et al. |
| 8,059,858 B2 | 11/2011 | Brundage et al. |
| 8,081,757 B2 | 12/2011 | Voessing et al. |
| 8,085,935 B2 | 12/2011 | Petrovic |
| 8,103,049 B2 | 1/2012 | Petrovic et al. |
| 8,138,930 B1 | 3/2012 | Heath |
| 8,151,113 B2 | 4/2012 | Rhoads |
| 8,181,262 B2 | 5/2012 | Cooper et al. |
| 8,189,861 B1 | 5/2012 | Rucklidge |
| 8,194,803 B2 | 6/2012 | Baum et al. |
| 8,249,992 B2 | 8/2012 | Harkness et al. |
| 8,259,873 B2 | 9/2012 | Baum et al. |
| 8,280,103 B2 | 10/2012 | Petrovic et al. |
| 8,301,893 B2 | 10/2012 | Brundage |
| 8,315,835 B2 | 11/2012 | Tian et al. |
| 8,321,679 B2 | 11/2012 | Petrovic et al. |
| 8,340,348 B2 | 12/2012 | Petrovic et al. |
| 8,346,532 B2 | 1/2013 | Chakra et al. |
| 8,346,567 B2 | 1/2013 | Petrovic et al. |
| 8,467,717 B2 | 6/2013 | Croy et al. |
| 8,479,225 B2 | 7/2013 | Covell et al. |
| 8,483,136 B2 | 7/2013 | Yuk et al. |
| 8,533,481 B2 | 9/2013 | Petrovic et al. |
| 8,538,066 B2 | 9/2013 | Petrovic et al. |
| 8,560,604 B2 | 10/2013 | Shribman et al. |
| 8,588,459 B2 | 11/2013 | Bloom et al. |
| 8,589,969 B2 | 11/2013 | Falcon |
| 8,601,504 B2 | 12/2013 | Stone et al. |
| 8,615,104 B2 | 12/2013 | Petrovic et al. |
| 8,666,528 B2 | 3/2014 | Harkness et al. |
| 8,682,026 B2 | 3/2014 | Petrovic et al. |
| 8,726,304 B2 | 5/2014 | Petrovic et al. |
| 8,745,403 B2 | 6/2014 | Petrovic |
| 8,768,714 B1 | 7/2014 | Blesser |
| 8,781,967 B2 | 7/2014 | Tehranchi et al. |
| 8,791,789 B2 | 7/2014 | Petrovic et al. |
| 8,806,517 B2 | 8/2014 | Petrovic et al. |
| 8,811,655 B2 | 8/2014 | Petrovic et al. |
| 8,825,518 B2 | 9/2014 | Levy |
| 8,838,977 B2 | 9/2014 | Winograd et al. |
| 8,838,978 B2 | 9/2014 | Winograd et al. |
| 8,869,222 B2 | 10/2014 | Winograd et al. |
| 8,898,720 B2 | 11/2014 | Eyer |
| 8,923,548 B2 | 12/2014 | Petrovic et al. |
| 8,959,202 B2 | 2/2015 | Haitsma et al. |
| 8,990,663 B2 | 3/2015 | Liu et al. |
| 9,009,482 B2 | 4/2015 | Winograd |
| 9,042,598 B2 | 5/2015 | Ramaswamy et al. |
| 9,055,239 B2 | 6/2015 | Tehranchi et al. |
| 9,106,964 B2 | 8/2015 | Zhao |
| 9,117,270 B2 | 8/2015 | Wong et al. |
| 9,147,402 B2 | 9/2015 | Chen et al. |
| 9,277,183 B2 | 3/2016 | Eyer |
| 9,596,521 B2 | 3/2017 | Winograd et al. |
| 9,602,891 B2 | 3/2017 | Winograd et al. |
| 9,607,131 B2 | 3/2017 | Winograd et al. |
| 2002/0032864 A1 | 3/2002 | Rhoads et al. |
| 2002/0059622 A1 | 5/2002 | Grove et al. |
| 2002/0078233 A1 | 6/2002 | Biliris et al. |
| 2002/0138695 A1 | 9/2002 | Beardsley et al. |
| 2003/0012403 A1 | 1/2003 | Rhoads et al. |
| 2003/0055979 A1 | 3/2003 | Cooley |
| 2003/0084294 A1 | 5/2003 | Aoshima et al. |
| 2003/0193616 A1 | 10/2003 | Baker et al. |
| 2003/0228030 A1 | 12/2003 | Wendt |
| 2004/0039914 A1 | 2/2004 | Barr et al. |
| 2004/0101160 A1 | 5/2004 | Kunisa |
| 2004/0250080 A1 | 12/2004 | Levy et al. |
| 2005/0182792 A1 | 8/2005 | Israel et al. |
| 2006/0047704 A1 | 3/2006 | Gopalakrishnan |
| 2006/0053292 A1 | 3/2006 | Langelaar |
| 2006/0083242 A1 | 4/2006 | Pulkkinen |
| 2006/0115108 A1 | 6/2006 | Rodriguez et al. |
| 2006/0239501 A1 | 10/2006 | Petrovic et al. |
| 2007/0003103 A1 | 1/2007 | Lemma et al. |
| 2007/0039018 A1 | 2/2007 | Saslow et al. |
| 2007/0071037 A1 | 3/2007 | Abraham et al. |
| 2007/0135084 A1 | 6/2007 | Ido et al. |
| 2007/0250560 A1 | 10/2007 | Wein et al. |
| 2008/0037825 A1 | 2/2008 | Lofgren et al. |
| 2008/0263612 A1 | 10/2008 | Cooper |
| 2008/0297654 A1 | 12/2008 | Verberkt et al. |
| 2008/0301304 A1 | 12/2008 | Chitsaz et al. |
| 2009/0060055 A1 | 3/2009 | Blanchard et al. |
| 2009/0089078 A1 | 4/2009 | Bursey |
| 2009/0158318 A1 | 6/2009 | Levy |
| 2009/0319639 A1 | 12/2009 | Gao et al. |
| 2010/0023489 A1 | 1/2010 | Miyata et al. |
| 2010/0054531 A1 | 3/2010 | Kogure et al. |
| 2010/0063978 A1 | 3/2010 | Lee et al. |
| 2010/0097494 A1 | 4/2010 | Gum et al. |
| 2010/0111355 A1 | 5/2010 | Petrovic et al. |
| 2010/0131461 A1 | 5/2010 | Prahlad et al. |
| 2010/0172540 A1 | 7/2010 | Davis et al. |
| 2010/0174608 A1 | 7/2010 | Harkness et al. |
| 2010/0281142 A1 | 11/2010 | Stoyanov |
| 2011/0058188 A1 | 3/2011 | Guo et al. |
| 2011/0088075 A1 | 4/2011 | Eyer |
| 2011/0103444 A1 | 5/2011 | Baum et al. |
| 2011/0161086 A1 | 6/2011 | Rodriguez |
| 2011/0164784 A1 | 7/2011 | Grill et al. |
| 2011/0188700 A1 | 8/2011 | Kim et al. |
| 2011/0261667 A1 | 10/2011 | Ren et al. |
| 2011/0281574 A1 | 11/2011 | Patel et al. |
| 2011/0286625 A1 | 11/2011 | Petrovic et al. |
| 2011/0293090 A1 | 12/2011 | Ayaki et al. |
| 2011/0307545 A1 | 12/2011 | Bouazizi |
| 2011/0320627 A1 | 12/2011 | Landow et al. |
| 2012/0023595 A1 | 1/2012 | Speare et al. |
| 2012/0063635 A1 | 3/2012 | Matsushita et al. |
| 2012/0072731 A1 | 3/2012 | Winograd et al. |
| 2012/0102304 A1 | 4/2012 | Brave |
| 2012/0113230 A1 | 5/2012 | Jin |
| 2012/0117031 A1 | 5/2012 | Cha et al. |
| 2012/0122429 A1 | 5/2012 | Wood et al. |
| 2012/0129547 A1 | 5/2012 | Andrews, III et al. |
| 2012/0203556 A1 | 8/2012 | Villette et al. |
| 2012/0203734 A1 | 8/2012 | Spivack et al. |

(56) References Cited

U.S. PATENT DOCUMENTS

| | | |
|---|---|---|
| 2012/0216236 A1 | 8/2012 | Robinson et al. |
| 2012/0265735 A1 | 10/2012 | McMillan et al. |
| 2012/0272012 A1 | 10/2012 | Aronovich et al. |
| 2012/0272327 A1 | 10/2012 | Shin et al. |
| 2012/0300975 A1 | 11/2012 | Chalamala et al. |
| 2012/0304206 A1 | 11/2012 | Roberts et al. |
| 2012/0308071 A1 | 12/2012 | Ramsdell et al. |
| 2013/0007462 A1 | 1/2013 | Petrovic et al. |
| 2013/0024894 A1 | 1/2013 | Eyer |
| 2013/0031579 A1 | 1/2013 | Klappert |
| 2013/0060837 A1 | 3/2013 | Chakraborty et al. |
| 2013/0073065 A1 | 3/2013 | Chen et al. |
| 2013/0114848 A1 | 5/2013 | Petrovic et al. |
| 2013/0117571 A1 | 5/2013 | Petrovic et al. |
| 2013/0129303 A1 | 5/2013 | Lee et al. |
| 2013/0151855 A1 | 6/2013 | Petrovic et al. |
| 2013/0151856 A1 | 6/2013 | Petrovic et al. |
| 2013/0152210 A1 | 6/2013 | Petrovic et al. |
| 2013/0171926 A1 | 7/2013 | Perret et al. |
| 2013/0188923 A1 | 7/2013 | Hartley et al. |
| 2013/0227293 A1 | 8/2013 | Leddy et al. |
| 2013/0271657 A1 | 10/2013 | Park et al. |
| 2014/0037132 A1 | 2/2014 | Heen et al. |
| 2014/0047475 A1 | 2/2014 | Oh et al. |
| 2014/0059116 A1 | 2/2014 | Oh et al. |
| 2014/0059591 A1 | 2/2014 | Terpstra et al. |
| 2014/0067950 A1 | 3/2014 | Winograd |
| 2014/0068686 A1 | 3/2014 | Oh et al. |
| 2014/0074855 A1 | 3/2014 | Zhao et al. |
| 2014/0075465 A1 | 3/2014 | Petrovic et al. |
| 2014/0075469 A1 | 3/2014 | Zhao |
| 2014/0114456 A1 | 4/2014 | Stavropoulos et al. |
| 2014/0115644 A1 | 4/2014 | Kim et al. |
| 2014/0130087 A1 | 5/2014 | Cho et al. |
| 2014/0142958 A1 | 5/2014 | Sharma et al. |
| 2014/0149395 A1 | 5/2014 | Nakamura et al. |
| 2014/0196071 A1 | 7/2014 | Terpstra et al. |
| 2014/0219495 A1 | 8/2014 | Hua |
| 2014/0267907 A1 | 9/2014 | Downes et al. |
| 2014/0270337 A1 | 9/2014 | Zhao et al. |
| 2014/0279549 A1 | 9/2014 | Petrovic et al. |
| 2014/0325550 A1 | 10/2014 | Winograd et al. |
| 2014/0325673 A1 | 10/2014 | Petrovic |
| 2015/0030200 A1 | 1/2015 | Petrovic et al. |
| 2015/0043728 A1 | 2/2015 | Kim et al. |
| 2015/0043768 A1 | 2/2015 | Breebaart |
| 2015/0063659 A1 | 3/2015 | Poder et al. |
| 2015/0093016 A1 | 4/2015 | Jiang et al. |
| 2015/0121534 A1 | 4/2015 | Zhao et al. |
| 2015/0170661 A1 | 6/2015 | Srinivasan |
| 2015/0229979 A1 | 8/2015 | Wood et al. |
| 2015/0261753 A1 | 9/2015 | Winograd et al. |
| 2015/0264429 A1 | 9/2015 | Winograd et al. |
| 2015/0324947 A1 | 11/2015 | Winograd et al. |
| 2015/0340045 A1 | 11/2015 | Hardwick et al. |
| 2016/0037189 A1 | 2/2016 | Holden et al. |
| 2016/0055606 A1 | 2/2016 | Petrovic et al. |
| 2016/0055607 A1 | 2/2016 | Petrovic et al. |
| 2016/0057317 A1 | 2/2016 | Zhao et al. |
| 2016/0150297 A1 | 5/2016 | Petrovic et al. |
| 2016/0182973 A1 | 6/2016 | Winograd et al. |
| 2016/0241932 A1 | 8/2016 | Winograd et al. |
| 2017/0272839 A1 | 9/2017 | Winograd et al. |
| 2017/0280205 A1 | 9/2017 | Winograd et al. |

FOREIGN PATENT DOCUMENTS

| | | |
|---|---|---|
| EP | 2489181 A2 | 8/2012 |
| EP | 2899720 A1 | 7/2015 |
| JP | 2004163855 | 6/2004 |
| JP | 2004173237 | 6/2004 |
| JP | 2004193843 | 7/2004 |
| JP | 2004194233 | 7/2004 |
| JP | 2004328747 | 11/2004 |
| JP | 2005051733 | 2/2005 |
| JP | 2005094107 | 4/2005 |
| JP | 2005525600 | 8/2005 |
| JP | 20100272920 | 12/2010 |
| KR | 1020080087047 | 9/2008 |
| KR | 20100009384 | 1/2010 |
| KR | 10201016712 | 2/2011 |
| KR | 20120083903 A | 7/2012 |
| KR | 1020120128149 | 11/2012 |
| KR | 20130074922 A | 7/2013 |
| KR | 20130078663 A | 7/2013 |
| KR | 101352917 B1 | 1/2014 |
| KR | 10201424049 | 7/2014 |
| WO | 00059148 A1 | 10/2000 |
| WO | 2005017827 | 2/2005 |
| WO | 2005038778 | 4/2005 |
| WO | 2006051043 | 5/2006 |
| WO | 2008045880 | 4/2008 |
| WO | 2009031082 | 3/2009 |
| WO | 2010073236 | 7/2010 |
| WO | 2010135687 | 11/2010 |
| WO | 2011046590 A2 | 4/2011 |
| WO | 2011116309 | 9/2011 |
| WO | 2012177126 A1 | 12/2012 |
| WO | 2012177874 A2 | 12/2012 |
| WO | 2013025035 A2 | 2/2013 |
| WO | 2013163921 | 11/2013 |
| WO | 2014014252 | 1/2014 |
| WO | 2015138798 | 9/2015 |
| WO | 2015168697 | 11/2015 |
| WO | 2015174086 | 11/2015 |
| WO | 2016028934 | 2/2016 |
| WO | 2016028936 | 2/2016 |
| WO | 2016029055 | 2/2016 |
| WO | 2016086047 A1 | 6/2016 |

OTHER PUBLICATIONS

International Search Report and Written Opinion dated Apr. 12, 2016 for International Application No. PCT/US2015/066872, filed Dec. 18, 2015 (7 pages).

Office Action dated Jun. 10, 2016 for Korean Patent Application No. 10-2016-7002291 (19 pages).

Office Action dated Jul. 28, 2016 for Korean Patent Application No. 10-2016-7002289 (11 pages).

Office action dated Nov. 30, 2016 for Korean Patent Application No. 10-2016-7002289 (4 pages).

"ATSC—3.0 Automatic Content Recognition Watermarking Solutions," ATSC Technology Group, Advanced Television Systems Committee, Inc., Jan. 2014 (6 pages).

Aris Technologies, Inc. "Audio Watermarking System to Screen Digital Audio Content for LCM Acceptance," May 1999 (17 pages).

Bangaleea, R., et al., "Performance improvement of spread spectrum spatial-domain watermarking scheme through diversity and attack characterisation," IEEE Africon, pp. 293-298, 2002.

Hartung, F., et al., "Watermarking of MPEG-2 encoded video without decoding and re-coding," Proc. SPIE Multimedia Computing and Networking 97, 3020:264-274, Feb. 1997.

Hartung, F., et al., "Watermarking of uncompressed and compressed video," Signal Processing, 3(66):283-301, May 1998.

International Search Report and Written Opinion dated Aug. 13, 2015 for International Application No. PCT/US2015/029097, filed May 4, 2015 (14 pages).

International Search Report and Written Opinion dated Dec. 7, 2015 for International Application No. PCT/US2015/045960, filed Aug. 19, 2015 (14 pages).

International Search Report and Written Opinion dated Jan. 28, 2016 for International Application No. PCT/US2015/045964, filed Aug. 19, 2015 (8 pages).

International Search Report and Written Opinion dated May 28, 2015 for International Application No. PCT/US2015/020282, filed Mar. 12, 2015 (7 pages).

Kalker, T., et al., "System issues in digital image and video watermarking for copy protection," Proc. IEEE Int. Conf. on Multimedia Computing and Systems, pp. 562-567, Jun. 1999.

(56) References Cited

OTHER PUBLICATIONS

Kirovski, D., et al., "Multimedia content screening using a dual watermarking and fingerprinting system," Proceedings of the tenth ACM international conference, pp. 372-381, 2002.

Kirovski, D., et al., "Multimedia content screening using a dual watermarking and fingerprinting system," Multimedia '02 Proceedings of the tenth ACM international conference on Multimedia, 2002 (11 pages).

Verance Corporation, "Confirmedia," PowerPoint presentation made to National Association of Broadcasters, Apr. 24, 2001 (40 pages).

Zhao, J., "A WWW service to embed and prove digital copyright watermarks," Proc. European Conf. on Multimedia Applications, Services and Techniques (ECMAST'96), May 1996 (15 pages).

Zhao, J., "Applying digital watermarking techniques to online multimedia commerce," Proc. Int. Conf. on Imaging Science, Systems and Applications (CISSA'97), Jun./Jul. 1997 (7 pages).

International Search Report and Written Opinion dated Mar. 15, 2016 for International Application No. PCT/US2015/062514, filed Nov. 24, 2015 (10 pages).

Extended European Search Report dated Sep. 21, 2017 for European Application No. 15762332.3 (9 pages).

Furon, T., "A constructive and unifying framework for zero-bit watermarking," CS.MM, Jan. 12, 2007.

Extended European Search Report dated Nov. 21, 2017 for European Application No. 15785628.7 (7 pages).

Extract a plurality of watermark messages from the primary content using a watermark extractor to produce an indication as to a state of the watermark detector, wherein one or more of the plurality of watermark messages include information that identifies a resource on a remote server to retrieve metadata associated with a section of the primary content, and the state of the watermark extractor includes one the following states:

(a) an unmarked content state indicating that at least a first section of the primary content that is processed by the watermark extractor does not include detected watermarks messages, (b) a marked content state indicating that at least a second section of the primary content that is processed by the watermark extractor includes one or more embedded watermark messages or parts thereof, or (c) a gap state indicating that at least a third section of the primary content that is processed by the watermark extractor immediately subsequent to the second section of the primary content does not include watermark messages or parts thereof,
1002

Use the one or more events or pattern of events to retrieve the metadata or modify a use of the metadata
1004

FIG. 10

WATERMARK DETECTION AND METADATA DELIVERY ASSOCIATED WITH A PRIMARY CONTENT

CROSS REFERENCE TO RELATED APPLICATIONS

This application claims the benefit of priority of U.S. Provisional Patent Application No. 62/084,465, filed Nov. 25, 2014, and U.S. Provisional Patent Application No. 62/093,996, filed Dec. 18, 2014, the entire contents of which are incorporated by reference as part of the disclosure of this document.

TECHNICAL FIELD

The subject matter of this patent document relates to management of multimedia content and more specifically to facilitate access and delivery of metadata, programs and services associated with a multimedia content based on watermarking techniques.

BACKGROUND

The use and presentation of multimedia content on a variety of mobile and fixed platforms have rapidly proliferated. By taking advantage of storage paradigms, such as cloud-based storage infrastructures, reduced form factor of media players, and high-speed wireless network capabilities, users can readily access and consume multimedia content regardless of the physical location of the users or the multimedia content. A multimedia content, such as an audiovisual content, can include a series of related images, which, when shown in succession, impart an impression of motion, together with accompanying sounds, if any. Such a content can be accessed from various sources including local storage such as hard drives or optical disks, remote storage such as Internet sites or cable/satellite distribution servers, over-the-air broadcast channels, etc.

In some scenarios, such a multimedia content, or portions thereof may contain only one type of content, including, but not limited to, a still image, a video sequence and an audio clip, while in other scenarios, the multimedia content, or portions thereof, may contain two or more types of content such as audiovisual content and a wide range of metadata. The metadata can, for example include one or more of the following: channel identification, program identification, content and content segment identification, content size, the date at which the content was produced or edited, identification information regarding the owner and producer of the content, timecode identification, copyright information, closed captions, and locations such as URLs where advertising content, software applications, interactive services content, and signaling that enables various services, and other relevant data that can be accessed. In general, metadata is the information about the content essence (e.g., audio and/or video content) and associated services interactive services, targeted advertising insertion).

Such metadata is often interleaved, prepended or appended to a multimedia content, which occupies additional bandwidth, can be lost when content is transformed into a different format (such as digital to analog conversion, transcoded into a different file format, etc.), processed (such as transcoding), and/or transmitted through a communication protocol/interface (such as HDMI, adaptive streaming). Notably, in some scenarios, an intervening device such as a set-top box issued by a multichannel video program distributor (MVPD) receives a multimedia content from a content source and provides the uncompressed multimedia content to a television set or another presentation device, which can result in the loss of various metadata and functionalities such as interactive applications that would otherwise accompany the multimedia content. Therefore alternative techniques for content identification can complement or replace metadata multiplexing techniques.

BRIEF DESCRIPTION OF THE DRAWINGS

FIG. 10 illustrates a set of operations that can be carried out to retrieve metadata associated with a primary content in accordance with an exemplary embodiment.

SUMMARY OF CERTAIN EMBODIMENTS

Figure 1:
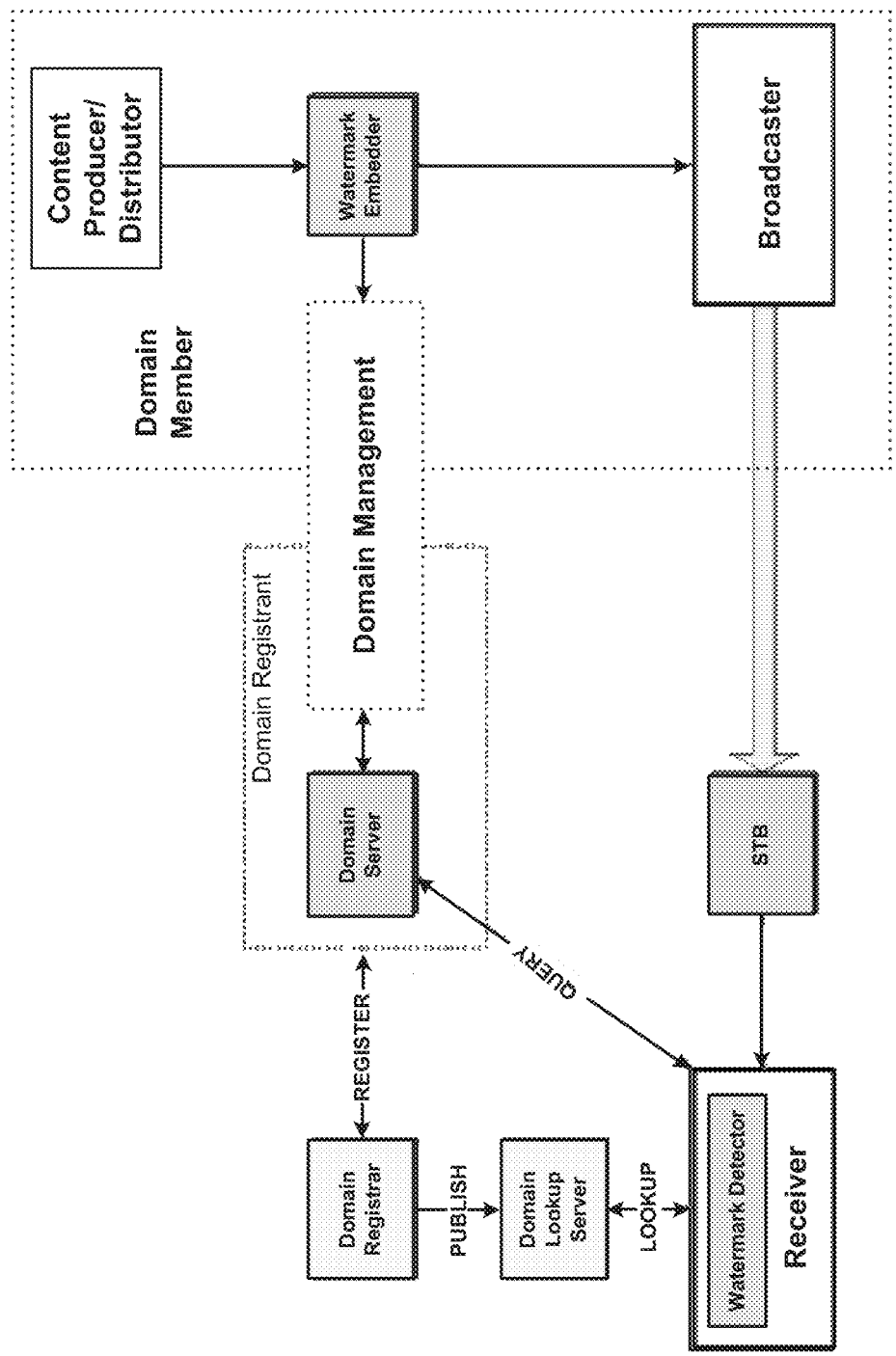
FIG. 1 illustrates a system for providing automatic content recognition and acquisition of metadata in accordance with an exemplary embodiment.

The disclosed technology relates to methods, devices, systems and computer program products that utilize an enhanced watermark extractor to facilitate access and delivery, and utilization of metadata, programs and services that are associated with a. primary multimedia content.

One aspect of the disclosed embodiments relates to a device that includes a processor and a memory including processor executable code. The processor executable code, when executed by the processor, causes the device to configure a watermark extractor to process digital samples of a primary content to extract a plurality of watermark messages from the primary content and to produce an indication as to a state of the watermark detector. The watermark messages can include information that identifies a resource on a remote server to retrieve metadata associated with a section of the primary content. The state of the watermark extractor includes one the following states: (a) an unmarked content state indicating that at least a first section of the primary content that is processed by the watermark extractor does not include detected watermarks messages, (b) a marked content state indicating that at least a second section of the primary content that is processed by the watermark extractor includes one or more embedded watermark messages or parts thereof, or (c) a gap state indicating that at least a third section of the primary content that is processed by the watermark extractor immediately subsequent to the second section of the primary content does not include watermark messages or parts thereof.

The watermark extractor transitions from a one state to another state upon occurrence of an event that is based on one or more of: (1) failure to detect a watermark message, or part thereof, subsequent to detection of at least one watermark message, (2) detection of a watermark message, or part thereof, subsequent to a failure to detect at least one watermark message, (3) detection of a section of the primary content with low activity, or (4) failure to detect embedded watermark messages for a predetermined interval of time. Based one or more events or pattern of events, retrieval of the metadata is enabled, or use of the metadata is modified. For example, a new secondary content associated with the primary content can be downloaded an presented, presentation of an existing secondary content can be modified, and the like.

The above noted device can be implemented as part of a. variety of devices, such as a consumer electronic device that is coupled to a television set or as part of a mobile device.

DETAILED DESCRIPTION

In the following description, for purposes of explanation and not limitation, details and descriptions are set forth in order to provide a thorough understanding of the disclosed embodiments. However, it will be apparent to those skilled in the art that the present invention may be practiced in other embodiments that depart from these details and descriptions.

Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

To mitigate the issues that can arise from the loss of content metadata that are carried in separate metadata channels is to embed watermarks into the content to enable automatic content recognition (ACR) and metadata recovery, Watermarks can be embedded in the audio and/or video portions of a content and are substantially imperceptible to a viewer (or listener) of the content. Properly designed watermarks can be immune to various content processing operations and channel impairments, such as compression and decompression, cropping, scaling, transcoding, format conversion, noise addition, acoustic propagation, optical (e.g., free space) transmission, digital-to-analog (D/A) and analog-to-digital (A/D) conversions and the like.

Once the embedded watermarks are detected by a watermark detector (also sometimes referred to as a watermark extractor), the payload of the watermark can be used to identify the content and recover the metadata associated with the identified content. In ACR applications, watermarks are often designed with a set of requirements that differ from requirements that are imposed on other watermark detectors, such as copy control watermark detectors. For example, in ACR applications it is critical to be able to recognize a content very quickly. After a content is recognized, the associated metadata can be recovered to enable various operations, such as receiving an additional content, performing dynamic advertising insertion, or participating in an interactive opportunity. Further, the viewing device (or an associated device) can be connected to the Internet (or more generally, to a remote database) for the retrieval of the additional content, for participating in the interactive opportunities or other services.

FIG. 1 illustrates a system for providing automatic content recognition for content that is provided by a broadcaster or redistributor to a consumer device and acquisition of interactive content that can be used for accommodating the disclosed embodiments. The system of FIG. 1 is one example of an ecosystem that can accommodate, and benefit from, the disclosed watermark detection techniques. The system of FIG. I is compatible with the requirements of the Advanced Television Systems Committee (ATSC), Inc., Call for Proposals For ATSC-3.0 AUTOMATIC CONTENT RECOGNITION WATERMARKING SOLUTIONS ATSC Technology Group 3 (ATSC 3.0) (S33 Doc. 067r3). It is understood, however, that the use of the system in FIG. 1 is not strictly limited to ATSC technologies, and such a system can enable access to a metadata associated with a content for non-ATSC technologies, as well.

In FIG. 1, the content is embedded with watermarks by a Domain Member prior to broadcast. For example, such a Domain Member can be a content producer or a Broadcaster. A Broadcaster (which can also be called a Redistributor) transmits the content to one or more user premises. Such content is often received at a receiver such as a set top box (STB), where decompression and formatting operations may take place before the content is provided (typically via a HDMI interface) to a viewing device (sometimes referred to as the "Receiver" or the "Receiver Device"). Such a Receiver can be compliant with the ATSC 3.0 standard. Decompression and formatting may alternatively take place within the Receiver. The Receiver which includes a watermark detector, examines the received content for the presence of watermarks. The detection of watermarks may trigger further actions such as identifying a domain name associated with the detected watermark payload and sending a. query to an identified domain server. Such a Receiver can operate as a client device which is communicatively connected to one or more servers and/or other client devices.

It should be noted that while in some implementations, the Receiver is a separate component than the set-top box, in other implementations the Receiver may include, or be part of a larger device that includes, any one or combinations of additional components such as a set-top box, a display, keyboard or other user interface devices, or a watermark detector, as well as processors (e.g., microprocessors, digital signal processors (DSPs), etc.) and other circuitry that may be needed for implementation of such device, or devices.

The watermark structure in some exemplary embodiments includes the following fields: a Domain ID and a Sequence ID, Each Domain ID is assigned by a central authority to a Domain Registrant who controls assignment and use of the Sequence ID codes under that domain. Each Domain ID maps one-to-one to an Internet domain name which is used to retrieve metadata associated with Sequence IDs in that domain. The Domain Registrar in FIG. 1 is a unique centralized entity responsible for registering such Domain IDs and publishing the mapping between the Domain IDs and domain names to Domain Lookup Servers. Domain registration is a process wherein a Domain ID is uniquely assigned to a Domain Registrant entity. The Domain Registrar provides Domain Registrant with a process (e.g., designated as REGISTER in FIG. 1) to establish and maintain the relationship between the Domain ID and a domain name (e.g., Internet format). Multiple Domain IDs may be mapped to the same domain name. The Domain Registrar further maintains a database of all mappings from Domain IDs to domain names. The Domain Registrar employs a standardized protocol (e.g., designated as PUBLISH in FIG. 1) to publish new and modified domain mappings to Domain Lookup Services that can include Domain Lookup Servers, as well as any other devices that may be needed to implement Domain Lookup Services. This protocol used by the Domain Registrar enables interoperability between the central Domain Registrar and all Domain lookup services. In some implementations, support for PUBLISH protocol is mandatory on both the Domain Lookup Servers and the Domain Registrar.

Domain Lookup Server(s) maintain a copy of the Domain Registration database which maps each registered Domain ID to a domain name and keeps it current using the PUBLISH protocol with the Domain Registrar. Domain Lookup Server(s) also employ a standardized protocol (e.g., designated as LOOKUP in FIG. 1) to provide domain name mappings from the database in response to Domain ID lookup queries originated by the Receivers. The use of a standardized LOOKUP protocol allows interoperability between any Receiver and any Domain Lookup Server. In some embodiments the Receivers are ATSC-compatible or ATSC-complaint. That is, those receivers comply with ATSC requirements, such as those under ATSC 3.0.

Domain Servers can be Internet servers that are accessible at the domain name associated with a registered Domain ID and can provide metadata to Receivers in response to queries triggered by watermark detections. In some implementations, queries employ a standardized message protocol (e.g., designated as QUERY in FIG. 1). A query is initiated by a Receiver and provides the domain server with a Domain ID and Sequence ID. The Domain Server responds with available metadata (e.g. broadcast channel identifier, a broadcast segment identifier, a timecode, a signaling) associated with the provided Domain ID and Sequence ID. Domain servers are not required to provide data for all required data fields available for all queries. In some embodiments, support for the QUERY protocol is mandatory on all Receivers and Domain Servers in order to enable interoperability among all receivers and content. This protocol enables interoperability between all receivers and all domain servers and support may be mandatory on both the receivers and the domain servers.

In one example implementation, a 50-bit payload can be embedded in every 1.5 seconds of the content. In this example, the watermark payload can be standardized with the following structure: [Payload Type:2] [Payload:48]. That is, the right-most 48 bits are designated to carry the payload and the 2 left-most bits are designated to carry the Payload Type. For example, the Payload Type values can be in the range 0 to 3, where a "0" designates a Reserved payload type, a "1" designate a Large Domain payload type, a "2" designates a Medium Domain payload type, and a "3" designates a Small Domain payload type. The payload type values can thus each describe the structure of the payload.

The Domain field from any structure can be mapped into a unique Domain ID by prepending the Payload Type value to the Domain field and zero-padding (on the right) to 32 bits. For ASCII encoding, the Domain ID can be represented as an 8-character hexadecimal value. Domain field value of 0 can be reserved in all domains. The Sequence field from any structure can be mapped directly into a Sequence ID, For ASCII encoding hexadecimal representation of the Sequence field (leading zeroes optional) can be utilized. Sequence IDs with decimal value of 1024 or less can be reserved for use as Control Codes. Control Codes are currently reserved.

The trigger bit, when set (e.g., to a value of "1"), can inform the Receiver of an event that may activate the Receiver to perform various operations such as requesting metadata from the domain server. It can indicate that further services or features, such as interactive content or advertising insertion associated with the Sequence ID is available to the Receiver from the domain server associated with the payload's Domain ID. In some implementations the trigger field can include multiple bits.

The watermark payload can undergo various coding, modulation and formatting operations before being embedded into a content. For example, the payload may be error correction code (ECC) encoded, scrambled, interleaved with other packets, appended with a synchronization or registration header, encrypted or channel coded to form a sequence of bits with particular characteristics. Once embedded into a host content, the embedded host content can be processed by a watermark extractor to recover the embedded watermark bits (or, more generally, symbols), and perform the reverse of the above coding, modulation or formatting schemes to recover the payload. In some instances, statistical techniques are used to recover the embedded symbols from the content using multiple instances of embedded watermarks.

Figure 2:
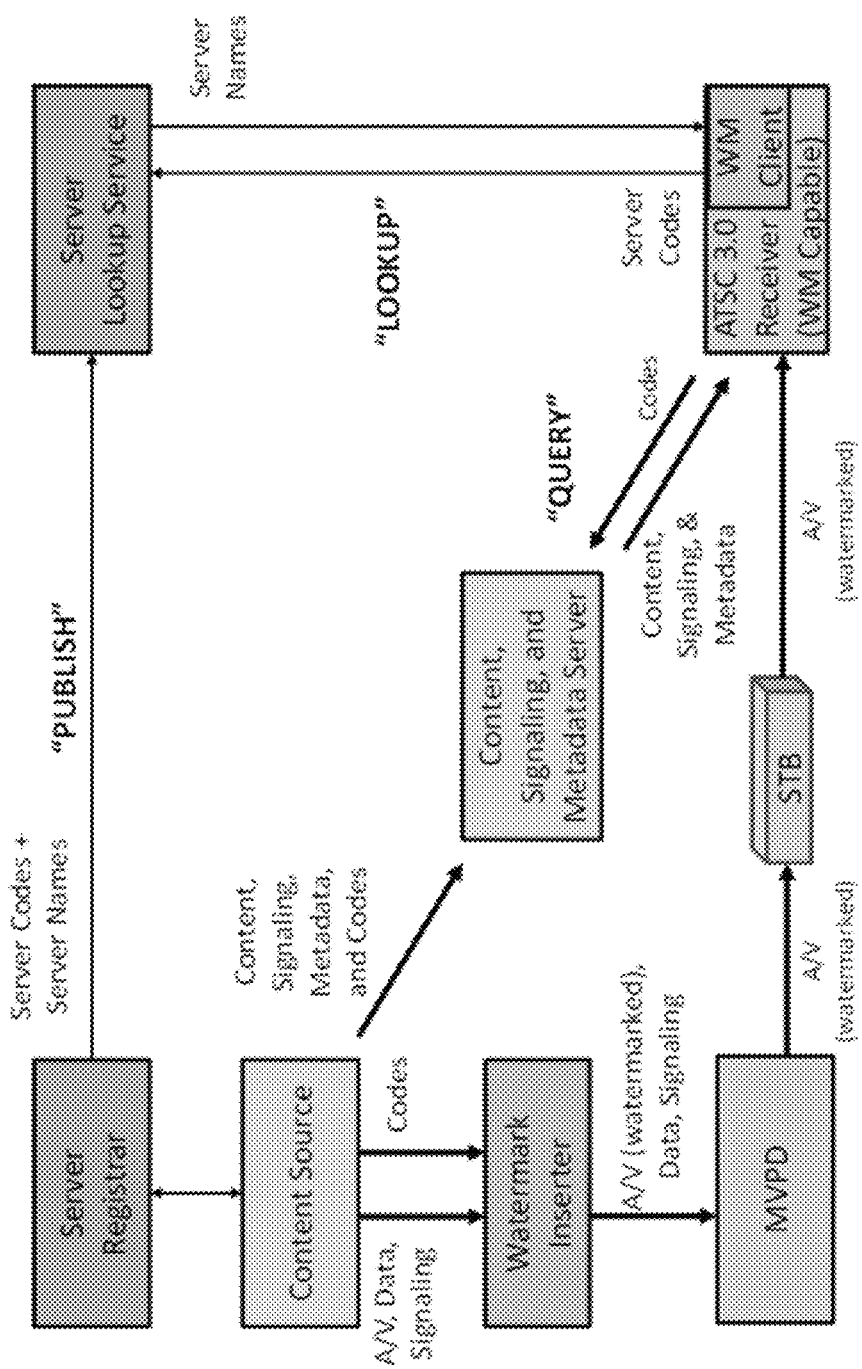
FIG. 2 illustrates another system and associated components that enables automatic content recognition and acquisition of corresponding metadata in accordance with an exemplary embodiment.

FIG. 2 provides another exemplary system that can accommodate, and benefit from, the disclosed embodiments, while conforming to ACR requirements of ATSC 3.0. It is understood, however, that the use of the system in FIG. 1 is not strictly limited to ATSC technologies, and such a system can enable access to a metadata associated with a content for non-ATSC technologies, as well. Several components that are shown in FIG. 2 can find analogous counterparts in FIG. 1. For example, the Server Registrar and the Domain Registrar; the Content, Signaling and Metadata Server and Domain Server; and the Server Lookup Service/server and Domain Lookup Server can carry out analogous operations. The various components in FIG. 2 are further described below. A Server Registrar is established by ATSC for the purpose of registering ATSC Domains and assigning to each a unique Server Code. Registrants inform the registrar of a Server Name, which is the Internet domain name or URI. at which metadata services associated with the Code Domain are located. The Server Registrar publishes the Server Code and associated Server Name to the Server Lookup Services.

One or more Server Lookup Services are established. These services may be operated by ATSC, the Server Registrar, Content Owners, ATSC Receiver manufacturers, or a third party. Each Server Lookup Service maintains a database of all Server Code/Server Name associations published by the Server Registrar and responds to lookup requests from ATSC Receivers. The Server Lookup Services do not need to access or store any-broadcast metadata; they simply provide ATSC Receivers with access to Server Names associated with Server Codes detected from broadcast watermarks.

A Content Source, acting either as a Server Registrant or in concert with a Server Registrant, associates a valid registered Server Code and one or more unique Interval Codes and maps them to intervals of broadcast content essence. The Content Source embeds those codes in the broadcast content using a Watermark Inserter prior to delivery of the broadcast content to an MVPD. The Sever Code can be analogous to the Sequence ID described in the exemplary watermark payload above.

The Interval Codes and the metadata for those same intervals of broadcast essence (e.g. any interactive content, signaling, metadata, triggers, channel identifier, media timeline timecode, etc.) are associated together in a database which is provided to a Content, Signaling, and Metadata Server ("CSM Server"). Content Sources may associate and embed watermarks continuously throughout their program material using sequentially increasing Interval Codes (e.g., analogous the Sequence ID described in the exemplary watermark payload above), may embed watermarks only in those intervals of content where interactive services are enabled, or may embed an Interval Code repeatedly through a program segment where an interactive service is available but does not require timing precision. Content Sources may register additional Code Domains in advance of depleting the Interval Code space associated with a given Server Code and may associate newly assigned Server Codes with the same Internet domain name to maintain infrastructure continuity.

The CSM Server responds to various requests from ATSC Receivers, including delivery of signaling and interactive content based on interactive service data received from a complete broadcast stream. The CSM Server also responds to code metadata queries, in which a query containing the watermark payload (e.g. in the ASCII representational format) is submitted by the WM Client in an ATSC Receiver, with a request for metadata associated with the interval of broadcast content. The metadata included in the CSM Server response may include channel identifiers, timecodes, content or segment identifiers, triggers, etc. It should be noted that while metadata services can be hosted in the same servers as the content and signaling services, they may alternatively be hosted on different servers from those used for content and signaling services.

To enable the architecture that is depicted in FIG. 2, open standards can be provided for the following three network protocols: PUBLISH, LOOKUP, and QUERY.

PUBLISH is a protocol whereby the Server Registrar notifies interested ecosystem participants of a newly established or updated mapping between a Server Code and an Internet domain name and publishes the association to Server Lookup Services.

LOOKUP is a protocol whereby an ATSC Receiver can submit a Server Code to a Server Lookup Service and receive a response containing the associated Server Name which has been most recently published by the Server Registrar.

QUERY is a protocol whereby an ATSC Receiver can submit a Server Code and Interval Code to a CSM Server and receive ATSC metadata (e.g. channel, timecode, interactive services triggers, etc.) associated with the specified interval of broadcast content.

The systems of FIGS. 1 and 2 thus, through the use of watermarks, enable advanced presentation features when reliable metadata about the content, timing, and desired presentation features is not delivered to the client device with the content.

One use case for such watermarks is to provide interactive applications that enhance audio/video experience of viewers. In this scenario, the receiver uses information that it obtains from the extracted watermarks to access a web based server and to download secondary content, which can be used to enhance the primary content; such a secondary content is typically presented in synchronization with the primary content. The secondary content can be also created simultaneously with the first content, and linking them through watermarks may be done by the content producers. The secondary content can include T-commerce, director's commentary, character background, alternate language tracks, statistics of athletes in a sport event, etc.

Another use case for the disclosed technology can be the insertion or replacement of interstitial content such as advertisements and promotions which are not the same for all viewers. Such advertisement and promotions may be selected based on various factors such as known viewer preferences, viewer location (which may be determined based on the viewer's IP address), the time at which content is being viewed, or other factors. These are generally referred to as "targeted ads." Typically targeted ads are performed under the control of a content distributor that uses the embedded watermarks to carry information that is obtained by the client device to recover insertion instructions. Further use cases include audience measurement, rights administration, proof of performance, etc.

The detectors that are designed to detect such watermarks for ACR and other above noted applications, are often designed with a set of requirements that differ from requirements that are imposed to other watermark detectors, such as copy control watermark detectors. For example, time to the first watermark payload detection is more important for ACR watermarks compared to a copy control watermarks because of, for example, the importance of enabling synchronized presentation of a secondary content with a primary content. Also for ACR detectors it is desirable to report the timing of watermark boundaries as precise as possible. Finally, for ACR detectors it is desirable detect changes in the content rendering timeline. For example when a user decides to switch from one content to another, or choses to skip forward or backward within a content, the ACR detector should recognize such an action as fast as possible and to report it to the entities or applications at the higher levels of hierarchy. It should be noted that the term ACR detector is not used to limit the scope of the disclosure to automatic content recognition application. But rather ACR provides one example use of the disclosed technology and is used to illustrate the underlying concepts. The disclosed embodiments provide refinements to the watermark detection processes, systems and devices that enable the above requirements and features to be implemented in an improved manner.

One of the basic assumption in describing some of the disclosed embodiments is that the watermark carries a string of digital symbols (which can be represented as a binary string). This string typically carries a synchronization portion (or a header portion), followed by a payload portion, and error correction and/or error detection strings. The watermark payload can also carry information about the primary content's timeline. Typically, this is achieved by including a field within the watermark payload (or a separate watermark) that constitutes a counter, which is incremented for each subsequent watermark. By detecting the watermark counter and knowing the watermark's extent (e.g., the duration or length of the primary content that each watermark occupies), the starting point within the primary content where watermark embedding started can be calculated. The watermark payload can further contain additional fields, such as an content ID, a channel ID, or a trigger flag. The trigger flag may signal to the device to perform predefined actions. For example, a trigger flag can signal to the receiver to halt any modification of audio and video in the primary content. Such a flag may be useful when the primary audiovisual content introduces an emergency alert that should not be disturbed.

Examples Marked Segment End Detection Considerations: End of watermarked content segment can be established by absence of watermark detection at the expected moment or location or within a predefined time interval or distance for the time/location that presence of a watermark is expected. However, this approach may not produce reliable results in all instances due to missing watermarks due to, for example, unfavorable content properties, or content processing operations such as a perceptual compression that may have degraded or removed the embedded watermarks.

One way to improve the reliability of marked content end detection is to use watermark prediction, Predicted watermarks symbols obtained from the content can be correlated with previously extracted watermark symbols and if the correlation value is high, may be concluded that the content includes embedded watermarks at the predicted locations. But if the correlation value is low, it may be concluded that the watermarks do not reside at the predicted locations. This techniques enables the determination as to whether or not the content is watermarked even if the watermark cannot be detected on its own without the prediction information.

In some prediction techniques, possible changes in the watermark payload at the prediction location are taken into account. For example, watermark prediction can take into account an expected increase in the predicted watermark counter value. In scenarios where the changes in watermark payload are unpredictable or are uncertain, such as changed in the trigger flag, predictions can account for each possible payload status, and test for correlations between the extracted watermark payload from the predicted location and each of the possible predictions (or until a correlation value of above a particular threshold is reached).

One way to determine a correlation between the predicted and extracted watermarks is to predict a watermark waveform and correlate it with extracted watermark waveform. This approach may require a very precise timing of embedded watermarks, as well as a significant processing power, which may not be suitable for all applications, Therefore. it may be preferred that only correlations between the predicted watermark bit pattern the extracted bit pattern be performed. In one example of this technique, the number of mismatches between the predicted and extracted bit patterns are computed and if the number meets a predetermined threshold, the end of marked content can be signaled. When the watermark bit pattern is long, it is often advantageous to correlate the extracted bit patterns to the predicted bit patterns on strings that are shorter than the entire watermark string, This way, the end of marked segment can be detected faster compared to the scenario in which the entire watermark is predicted.

Furthermore, prediction of a fragment of the watermark bit string can he used to quickly confirm that the extracted payload is not a false detection. It is well known that when error correction code (ECC) decoding is used for detecting watermarks, a watermark can be falsely detected even in a content that does not include a watermark, or a watermark can be detected with an incorrect value from a marked content. Typically, error correction algorithms provide information on how many errors are corrected in the particular extraction event. If the number of corrected errors is too high, then the false positive probability may be unacceptably high. In cases where the number of corrected errors is too high, declaration of successful payload extraction can be postponed by first confirming that the correctness of the payload by: predicting a subsequent bit string fragment, and verifying that it indeed can be extracted. Only if the subsequent bit string fragment is found with sufficiently low mismatch count (i.e., with reliability that is higher than a predefined threshold), the detector reports the extracted payload. This way, the time to first watermark detection can be shorter compared to the scenario in which correlation with entire watermark string is performed.

One exemplary method for detecting the end of a watermark includes predicting an expected watermark payload including predicting the state of a watermark counter, detecting a watermark, and correlating the predicted watermark with the detected watermark that includes comparing the predicted and detected state of a watermark counter, and concluding that a watermark is present when the correlation is above a predetermined threshold. Predicting the state of the watermark counter can include predicting a watermark waveform, and correlating the predicted watermark with the detected watermark can include comparing the predicted and detected watermark waveforms.

In some embodiments, Predicting the state of the watermark counter can include predicting a watermark bit pattern and correlating the predicted watermark with the detected watermark can include comparing the predicted and detected watermark bit patterns. For example, the correlating can include counting the number of mismatches between predicted and detected bit patterns and if the number of mismatches is above a threshold then signaling and end of the watermarked content. In some embodiments, the correlation is only performed on a subset of the entire bit string of the detected watermark. In another embodiment, the watermark includes error correction codes and correlation includes counting the number of corrected errors, and if the number of corrected errors exceeds a threshold, confirming the correctness of the payload by predicting subsequent bit string fragments and determining the number of mismatches between predicted and detected bit string fragments, and reporting the extracted payload only if the number of mismatches is below a predetermined threshold.

Example Watermark Boundary Precision Considerations: In addition to above noted correlation of predicted and extracted bit patterns, it is beneficial to have a good prediction of bit boundaries. Typically a slight shift of bit boundaries produces also a bit pattern that is well correlated to the embedded pattern. In order to improve detector performance in the presence of uncertainty in the precise locations of bit boundaries, um bit-patterns of the same watermark can be extracted, with time offsets that are only a fraction of a bit interval. Typically bit patterns with different time offset have different correlation values when matched to predicted bit pattern, and the timing of the pattern associated with the best correlation value can be used as the best prediction of the watermark position in time.

The same technique can be used to improve watermark boundary detection. In particular, extract multiple watermarks are extracted with offsets in their position that are a fraction of the bit interval, are correlated with a predicted pattern (or subjected to error correction code), and the number of bit errors is counted in each of trials. The position of watermark with the smallest bit error count can be considered as the most likely watermark position and used to calculate the content timeline.

Alternatively, the data indicative of how the bit errors change with the shift of bit boundary position can be used in mathematical model or function to identify the most likely location that results in a minimum bit-error count. For example, the change of bit-error counts can be modeled as a function of time by approximating it in a least-square sense by a second order polynomial. The minimum location obtained by the second order polynomial can then be used to approximate the watermark boundary location with better accuracy.

One aspect of the disclosed embodiments relates to a method of predicting watermark boundaries that includes extracting multiple bit patterns of the same watermark, where the multiple bit patterns have time offsets from each other that are a fraction of a bit interval. By correlating each extracted multiple bit pattern with a predicted bit pattern, it can be determined which bit pattern produces the highest correlation with the predicted bit pattern, and the position of the bit pattern with the highest correlation can be selected as the predicted watermark position. The selected watermark position in time can be used to also determine the watermark boundary. Another exemplary method of predicting watermark boundaries includes extracting multiple bit patterns of the same watermark, where the multiple bit patterns have time offsets from each other that are a fraction of a bit interval. The method also includes determining bit errors as a function of a. shift in bit boundary to determine the position with the least bit error count, and selecting position of the determined position with the least bit error count as the selected prediction of the watermark position in time.

Example Gap Detection Considerations: One of benefits provided by the disclosed watermarks is the ability to enable a receiver with web access to download additional application from the Internet o enhance the primary audiovisual content or to insert or replace interstitial content such as advertisements and promotions which are not the same for all viewers (a.k.a. targeted ads). It is thus desirable to identify certain events that can occur at the receiver device, such as when a user switches to a different channel, pauses the content, or skips ahead or back within the content.

In some scenarios, the rendering device, such as a TV set, may not be aware of the above described, and other, user actions. For example, when a TV set is receiving content from a Set Top Box (STB) or a Personal Video Recorder (PVR) over an HDMI cable, those content sources may not be able to inform the TV set about content transitions. Furthermore, an STB or a PVR may intentionally mask content transitions by synthesizing content (e.g. blank frames and silent audio) and buffering the content from a new source in order to avoid resynchronization and HDCP re-authentication. Therefore, detection of an audio silence interval or a group of blank screens may provide a mechanism for recognizing content transitions.

Yet, audio silence and featureless frames of video may occur in the original content, as well. For example, audio can be muted at the source due to noise gate or profanity filters, or in order to signal that it is time for advertisement insertion. Thus, it is desirable to discriminate between gaps that are produced due to user actions and gaps that pre-exist in the content (e.g., gaps that exist prior to embedding of watermarks). One way to achieve this is to use dither embedding, Dither embedding is sometimes used to insert watermarks into sections of the content devoid of significant activity (e.g., silent or quite intervals, flat areas, etc.), which are not naturally suitable for insertion of watermarks. Dither signal is generally a low amplitude signal that resembles noise and can be shaped so that, When added to a content, it does not produce objectionable or even perceptible artifacts. By modulating the dither signal in a particular manner, different watermark symbol values can be inserted into the sections of the content that are devoid of significant activity, while maintaining imperceptibility of the embedded watermarks. Note that typically watermark embedding is done as part of content distribution phase (in order to discriminate different distribution channels) and all gaps introduced at the source can be covered by dither embedding.

In the presence of dither embedding, the device can determine whether or not a detected gap is an integral part of the content by predicting the watermark bit string that is expected in be present at the location of the detected gap, and checking if such a string is potential watermark symbols that are detected from the location of the gap (with few mismatches). If the expected bit string is found, then the gap must have existed in the content prior to embedding. But if the expected string is not found, then the gap is likely created by a subsequent content transition, such as switching from one content to another, or skipping forward or backward within the content.

Even in the absence of dither embedding and above described discrimination between gaps that exist prior to embedding from gaps that created by content transition, it is still possible to automatically detect gaps and use this information to, for example, avoid display of secondary content or targeted ads during such gaps. In this scenario, the timing of presentation of interactive content should not be scheduled during or immediately after gaps, if possible.

Figure 3:
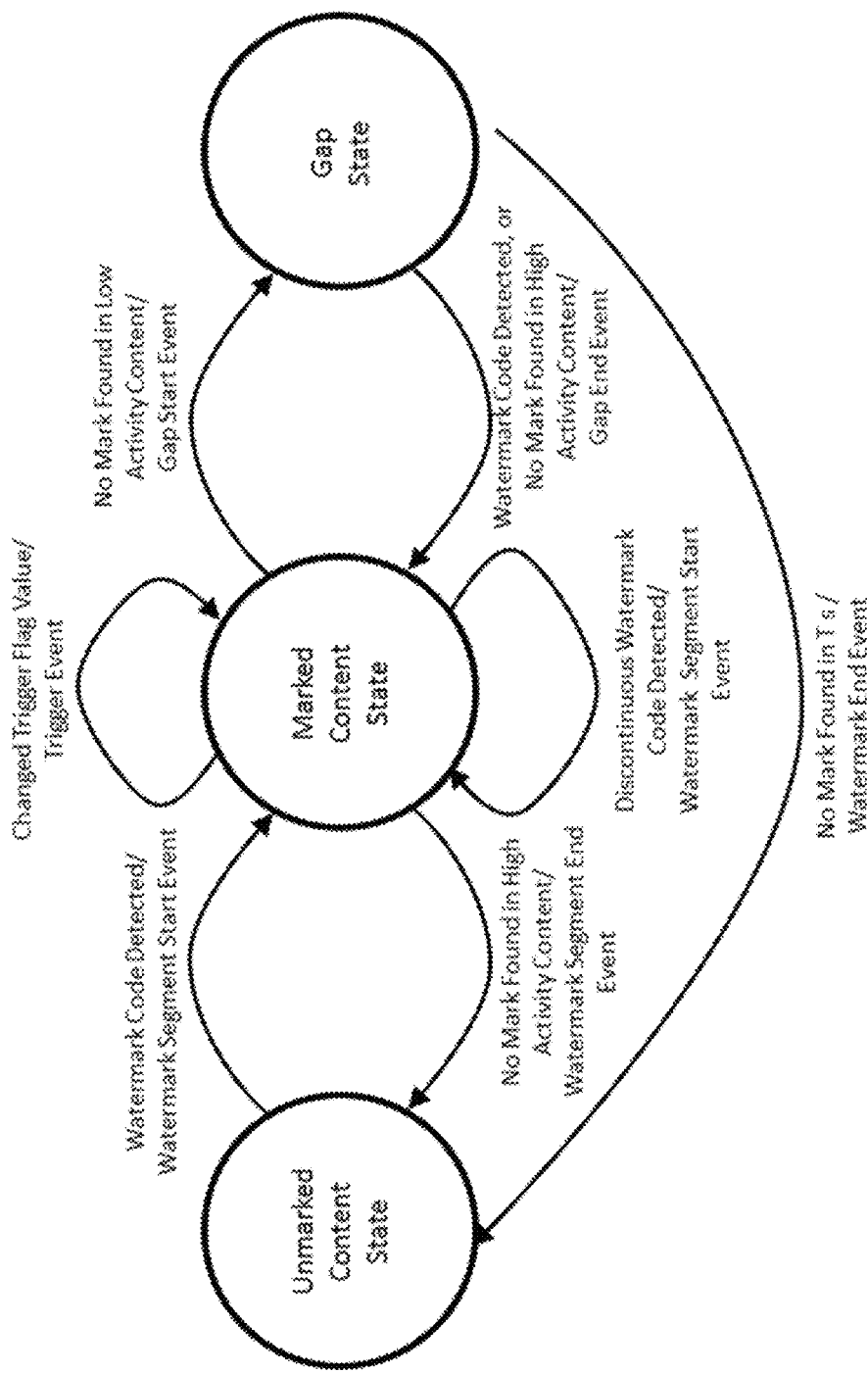
FIG. 3 illustrates a watermark extractor state diagram with associated transition triggers in accordance with an exemplary embodiments.

Example Detector State Change Considerations: A watermark detector output of the disclosed embodiments can be described as moving between three different states: an unmarked content state, a marked content state and a gap state. An unmarked content does not include an embedded watermark; a marked content include embedded watermarks; and a gap state is indicative of a content that is assumed to have embedded watermark which can not be detected due to detection of a gap. FIG. 3 shows a detector state machine with possible transition triggers and associated actions based on the above described states. In some embodiments, when detector is initialized it is placed in the unmarked content state. FIG. 3 also shows "events" that describe the detection of a change of state of watermark segments, and include: Watermark Segment Start (WSS), Watermark Segment End (WSE), Gap Start (GS), Gap End (GE), and Trigger (TR) events.

Gap Start, Gap End and Trigger events occur only between Watermark Segment Start and Watermark Segment End events (i.e., during a watermarked segment).

A Watermark Segment Start event is output from the watermark detector when a watermark code is detected in the input primary content which does not have continuity with a previously detected watermark code. Continuity exists when successive watermark codes conform to the watermark segment embedding specification. For example, those watermarks can have the same Server Code, successive Interval Codes, the same trigger bit status, and a watermark code spacing of 1.5 seconds. A Watermark Segment Start event can cause a transition from the Unmarked Content State to the Marked Content State, or a transition from the Marked Content State to the same state when caused by detection of a discontinuous watermark code.

A Gap Start event is output from the watermark detector when a watermark code is not detected with continuity from the primary content following a previous watermark code. In some embodiments, the Gap Start event is accompanied by a low audio/video condition, a blank interval indication, or other indications of low content activity. A Gap Start event causes a transition from the Marked Content State to the Gap State.

A Gap End event is output from the watermark detector when, following a Gap Start event, a low audio/video condition, a blank interval indication, or other low content activity indications are no longer present or when a watermark code is detected. A Gap End event causes a transition from the Gap State to the Marked Content State. Examples of an content with low activity include an audio segment with audio characteristics below a predetermined threshold, an audio segment that is mute, a blank video frame, a video frame with a blanks portion, or a video frame or a section of a video frame with low visual activity. Based on experiments conducted by the inventors, disturbances, such as channel change, skip forward or skip back, in the playback of a digital television broadcast produces brief intervals of low or zero content activity, such as silence intervals. As noted earlier, in some embodiments dither embedding is used during, or prior to, content distribution to embed watermark messages even in low activity content sections. In such embodiments, failure to detect watermarks from low activity sections of a received content is a strong indication that a content interruption due to a user action (e.g., channel change, skip ahead, etc.) has taken place. In some scenarios, detection of such content interruptions causes the associated interactive secondary content to he suspended.

A Watermark Segment End event is output when the watermark detector determines that a watermark code cannot be detected with continuity in the primary content following a previous Watermark Segment Start event and a low audio/video condition or a blank interval indication is not present. A Watermark Segment End event is only output based on a failure to detect a continuous watermark code; it is not output when a discontinuous watermark code is detected (in this case, a Watermark Segment Start event is output). A Watermark Segment End event causes a transition from the Marked Content State to an Unmarked Content State.

A Trigger event is output from the watermark detector when the value of the Trigger field of a watermark code is determined to have changed between consecutive watermark codes in a watermark segment. When a Trigger event occurs, the watermark detector outputs the watermark code, and the timing information associated with the detected watermark (e.g., content timeline at which the trigger event occurred, starting boundary of the watermark payload carrying an instance of a watermark code, etc.

Referring again to FIG. 3, the only event that can cause the detector to exit the unmarked content state is detection of a watermark, which triggers a Watermark Start Segment event in conjunction with a query to the web server to access metadata and transition to Marked Content State. In Marked Content State, there are four possible events. First, it is possible to detect the trigger flag, which again causes a Trigger event in conjunction with a query to the web server to access metadata, but the detector remains in the Marked Content State. When a discontinuous watermark code is detected, it causes a Watermark Segment Start event in conjunction with a query to the web server to access metadata, while the detector remaining in the Marked Content State. This scenario corresponds to content transition without a gap detection.

Further. when low content activity (e.g., low audio) is detected and predicted packet fragments have too many errors, a Gap Start State is signaled, signifying a likely content transition, and the detector move to the Gap State. Finally, in some embodiments, when no watermarks are found over a predefined time interval of T seconds (including continuously failing prediction attempts) the Watermark End Event is signaled, signifying that content has been switched and all interactivity should be canceled.

From the Gap State, a transition to the Marked Content State is possible when a watermark is detected or watermark prediction succeeds (e.g., mismatch between predicted and extracted bit patterns is below a threshold). Also when watermark detection fails, but high activity content (e.g., an increased audio energy) is found before a predefined time interval of T seconds expires, the detector exits the Gap State and transition to the Marked Content State, as part of a Gap End event. When watermark detection fails over the predefined time interval, detector signals Watermark Segment End event, signifying that all interactivity should be canceled upon transitioning from the Gap State to the Unmarked Content State.

The above-described state machine architecture enables systematic access to metadata at a remote server based on a state of the watermark detector and particular events that cause transitions to different states. In one embodiment, a watermark detector state machine includes a watermark detector having three starts including an unmarked content state, a marked content state and a gap state. In the unmarked content state, the detection of a watermark triggers a watermark segment start event that causes the watermark detector to query a web server to access metadata and to transition the watermark detector to a marked content state. In the marked content state, the detection of a trigger flag causes no change in the state but causes a query to a web server to access metadata. The detection of a discontinuous watermark code causes the detector to remain in the marked content state, but causes a query to a web server to access metadata. The detection of low content activity signals a gap start event and a detector transaction to a gap state, while the detection of no watermark over a predefined time interval signals a watermark segment end event and a detector transition to the unmarked content state. In the gap state, the detection of a watermark triggers a gap end event and a transition to a marked content state.

Figure 4:
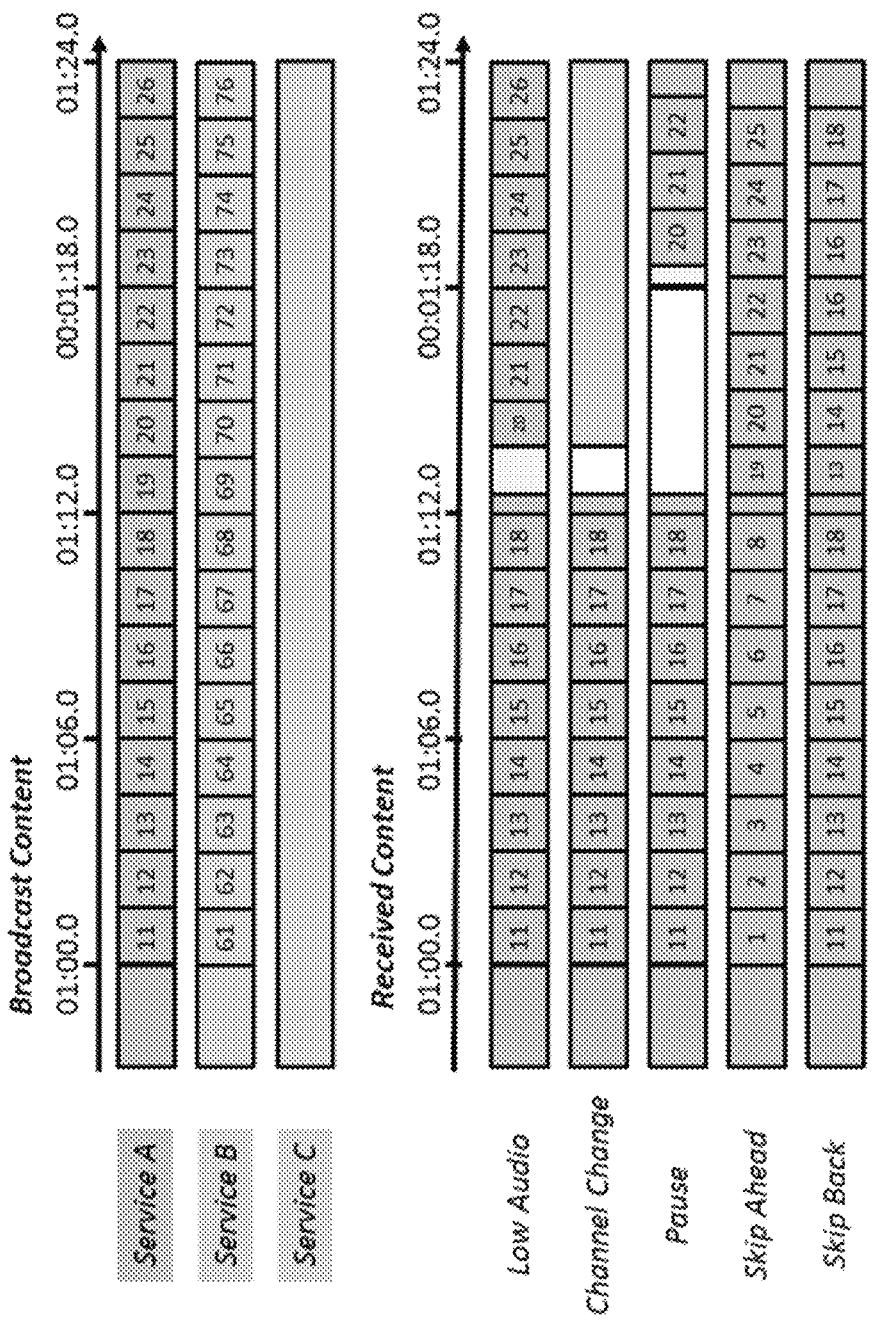
FIG. 4 is a simplified diagram showing content timelines and detected watermark values in exemplary content interruption scenarios.

FIG. 4-9 illustrate example scenarios that can lead to detection of gap in the embedded watermarks, and thus to transitions from one of the above-described states to another. In particular, FIG. 4 shows timelines for a broadcast content and content that is received at client device's watermark extractor. The content that is labeled as received content can correspond to the content that is viewed on a client device or to content that is received by client device, such as a television set over an HDMI interface that is not aware of content interruptions of transitions. In the example of FIG. 4, three broadcast contents are depicted, two of which, Service A and Service B, carry distinct watermarks that are identified by an increasing sequence of numbers. As noted earlier, sequential (or predictably changing) numbers can be carried as part of the watermark payload. The third broadcast content, Service C, is an unmarked content. A user can select a particular broadcast of a service provider for viewing, and can switch between different programs, pause, skip forward or backward or perform other operations as part of viewing a content at a user device. In the bottom section of FIG. 4, five example scenarios and the sequence of detected watermarks are depicted. These scenarios will be further in connection with FIGS. 5-9. It should be noted that while the scenarios at the bottom of FIG. 4 only depict the use of Service A and (in case of channel change) the unmarked Service C for simplicity, these and other scenarios can modified or augmented with the use of Service B.

Before turning to detailed discussions of FIGS. 5-9, it is important to note that in ACR applications it is critical to be able to recognize a content very quickly. After a content is recognized, the associated metadata can be recovered (e.g., from an affiliated database) to enable various operations, such as receiving an additional content, performing dynamic advertising insertion, or participating in an interactive opportunity. Further, the viewing device (or an associated device) can be connected to the Internet (or more generally, to a remote database) for the retrieval of the additional content, for participating in the interactive opportunities or other services. It is also important to provide those additional content and metadata in a manner that conforms to the changes in the main content presentation, including pauses, fast forward, skip, channel change and others. For instance, when a channel change occurs, the associated secondary content (e.g., an interactive content, an advertisement, etc.) may need to be modified, as well. In other examples, the associated secondary content may need to be stopped, modified or in some cases maintained without any change depending on the type of user action that is taking place.

The following scenarios illustrate how the secondary content presentation can be affected base on the type of content interruption. When a user decides to access the program guide while viewing a particular content, part of the main video program can be obstructed by the program guide information that is displayed as an overlay, while the audio content remains uninterrupted. in some implementations, the program guide and the main video program are presented in a picture-in-picture (PIP) format, in two separate windows, which typically causes the main window to shrink. In another scenario, an interruption in the audio playback can occur when a user mutes the audio while viewing a main program uninterrupted. When a secondary content is also being presented in association with the m content, such interruptions may necessitate different changes to the presentation of the secondary content, as well. For example, when a program guide is being viewed, presentation of the secondary content may need to be paused, or presented as a semi transparent overlay, in order to allow proper viewing of the program guide, On the other hand, when a program is muted, the presentation of a secondary content may continue uninterrupted.

As an initial step in enabling the proper presentation of the secondary content, various transitions to from one state to another state caused by gaps or detection of a change in watermark values musty be quickly recognized. As illustrated by the above examples, identification of the type of gaps (or actions that caused such gaps) can further trigger acquisition of metadata and/or new or additional secondary content, modify the use of the metadata or to cause the presentation of an existing secondary content to be modified.

Figure 5:
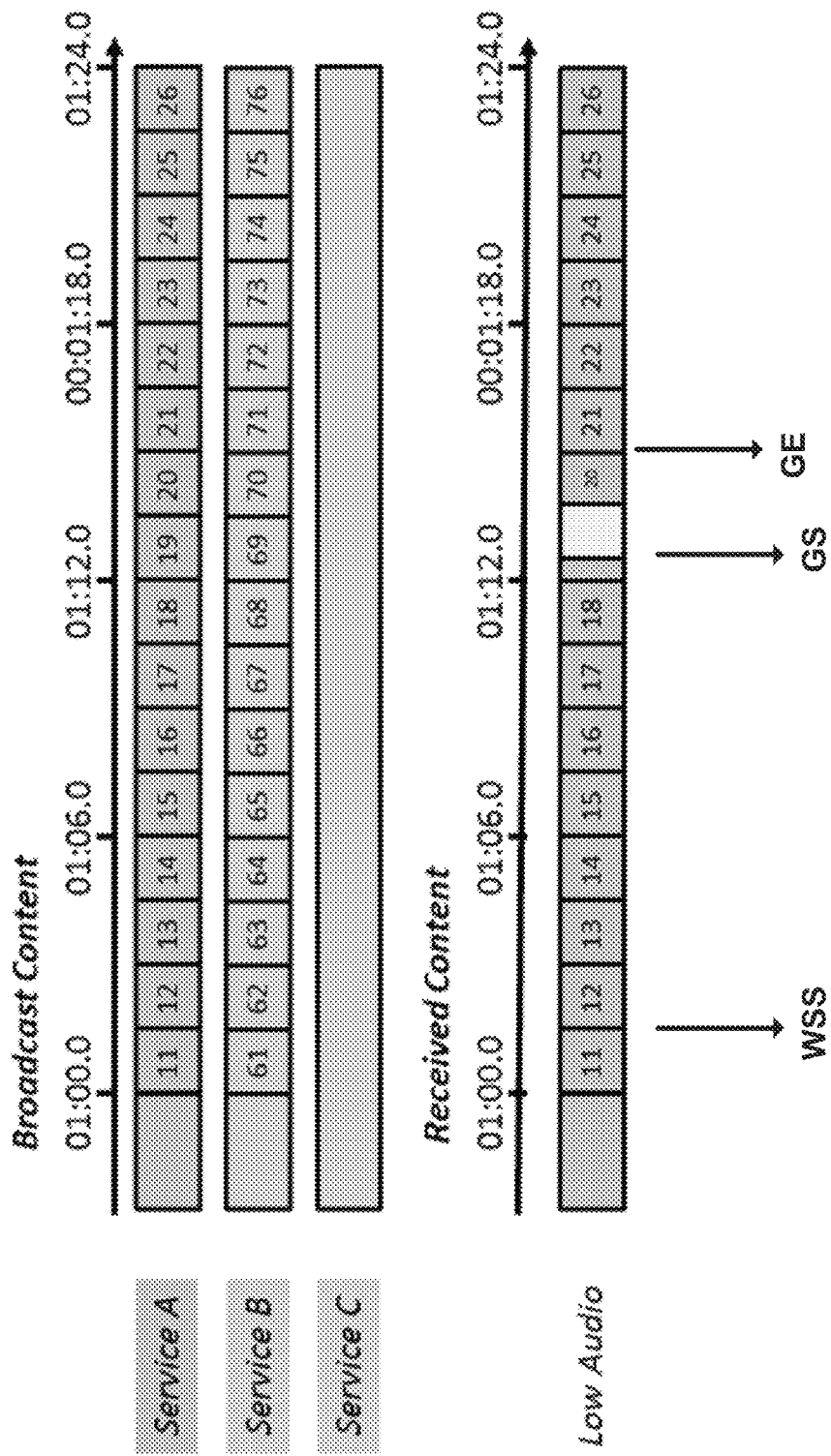
FIG. 5 is a simplified diagram of a content timeline and detected watermarks associated with a low activity content.

Referring now to FIG. 5, a simplified diagram of a content's timeline associated with a low activity content is presented. In the example diagram of FIG. 5, an audio content is being analyzed and therefore the content's low activity corresponds to having a low audio (e.g., an audio with volume or energy levels below corresponding threshold values). As shown in FIG. 5, upon detection of the initial watermark(s), the detector enters a Marked Content State caused by a Watermark Segment Start (WSS) event. The Marked Content State persists until the detector fails to detect a watermark (i.e., the watermark that is to follow watermark #18 in FIG. 5). At the same time, however, low activity in the content is detected. The detection of low activity (e.g., low audio) can be signaled via a higher level application (e.g., by analyzing an associated metadata) or, in some embodiments, by processing the audio content and determining that the particular segment of audio has a low energy profile. At this stage, upon the failure to detect a watermark, a Gap Start (GS) event is triggered, the detector enters a Gap State, and remains in that state until the next watermark in the expected sequence is detected. In FIG. 5, this is shown by detection of watermark #20 with a smaller font size, which can, for example, represent detection of a dither-embedded watermark or a watermark detected by partial packet prediction. Upon the detection of watermark #20, a Gap End (GE) event is triggered and the detector returns the Marked Content State. In some embodiments, using watermark packet prediction techniques that were described earlier, the detector can successfully predict that at least a portion of watermark #19 is detected and remains in the Marked Content State and thus never enters the Gap State.

Figure 6:
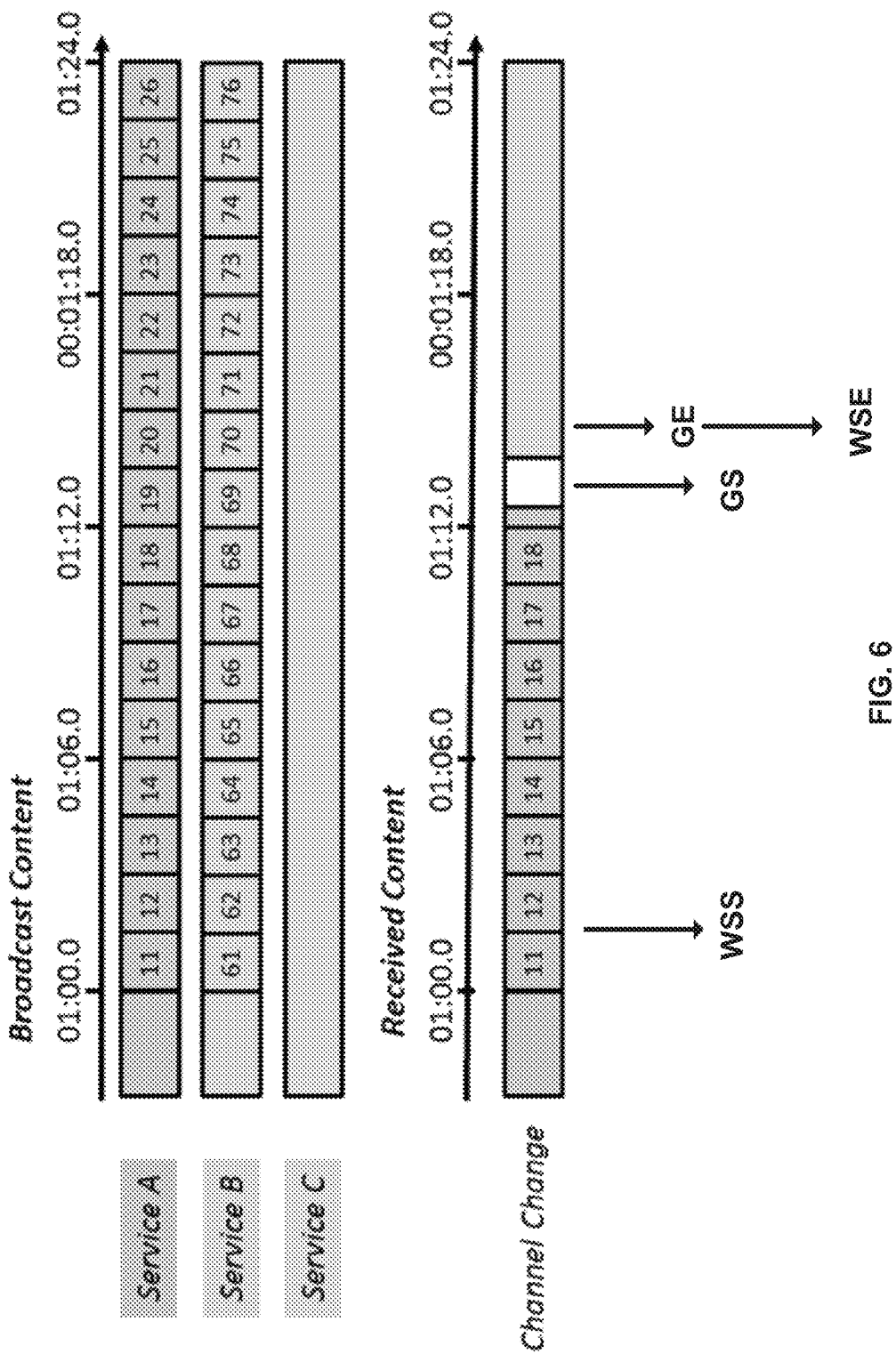
FIG. 6 is a simplified diagram of a content timeline and detected watermarks associated with a channel change interruption.

FIG. 6 is a simplified diagram of a content's timeline associated with a channel change operation. Upon detection of the initial watermark(s), the detector enters a Marked Content State caused by a Watermark Segment Start (WSS) event. The Marked Content State persists until the detector fails to detect a watermark (i.e., the watermark that is to follow watermark #18 in FIG. 6). At this time, a Gap Start (GS) event is triggered and the detector enters a Gap State, Detection of a such gap is expected in a channel change scenario because it often takes some time to transition from one channel to the next, in the exemplary scenario of FIG. 6, the channel change causes presentation of the content from Service C, which does not include any watermarks. Upon a failure to detect any watermarks for a pre-defined period of time (and in the absence of a low activity signal or indication), a Gap End (GE) is triggered, followed by a Watermark Segment End (WSE), which causes the detector to transition to the Unmarked Content State. As noted earlier, the scenario depicted in FIG. 6 (and other figures) can be augmented or modified with the use of content from Service B. For example, if instead of Service C, the user had switched to a program on Service B, discontinuous codes would have been detected (e.g., depicted watermarks in the 60's or 70's range would have followed the gap). Such discontinuous codes can include a different server code and/or interval code than the expected server and/or interval codes.

Figure 7:
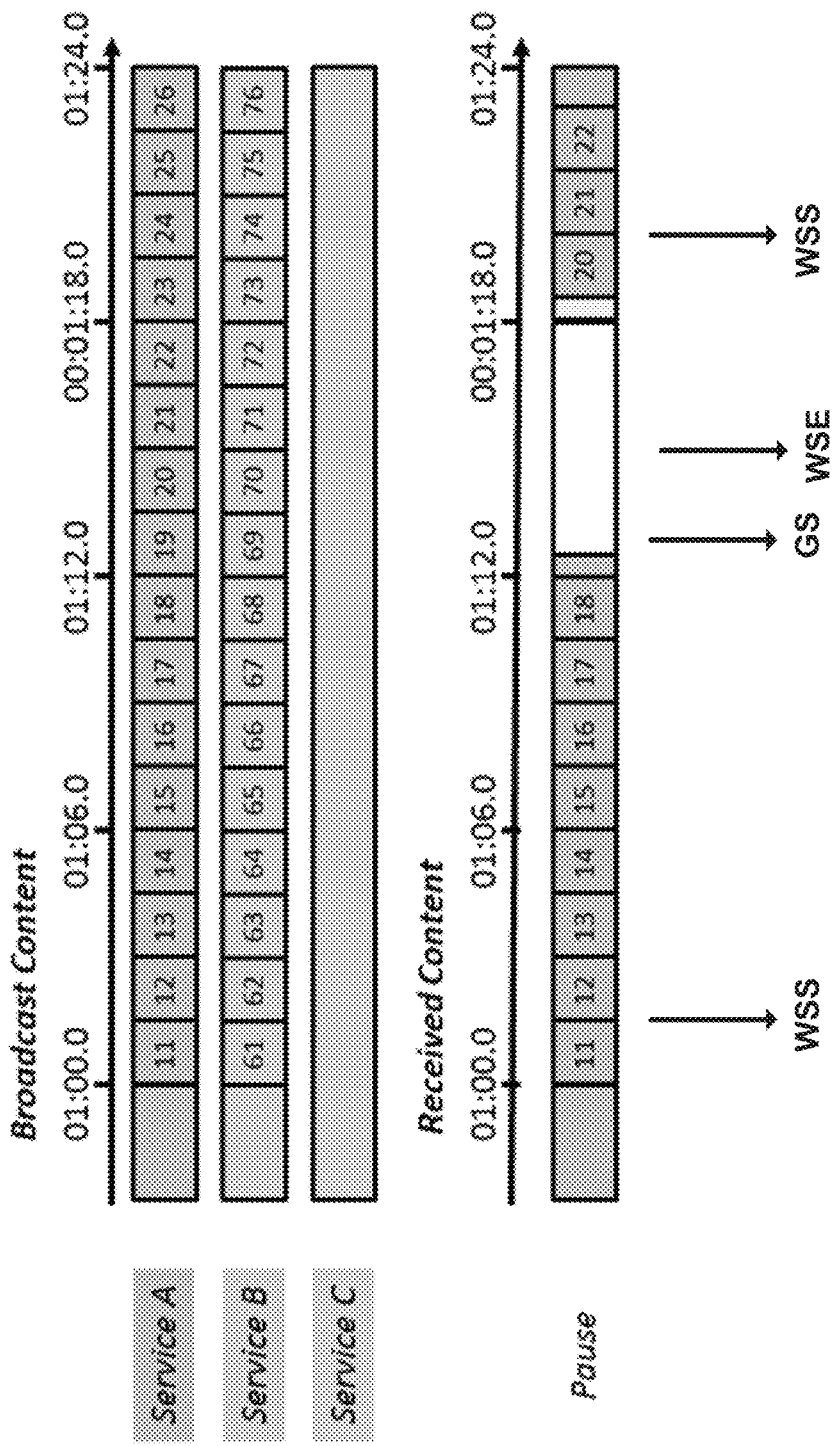
FIG. 7 is a simplified diagram of a content timeline and detected watermarks associated with a pause operation.

FIG. 7 is a simplified diagram of a content's timeline associated with a pause operation. Upon detection of the initial watermark(s), the detector enters a Marked Content State caused by a Watermark Segment Start (WSS) event, The Marked Content State persist until the detector fails to detect a watermark (i.e., the watermark that is to follow watermark #18 in FIG. 7). At this time, a Gap Start (GS) event The Marked Content State persists until the detector fails to detect a watermark (i.e., the watermark that is to follow watermark #18 in FIG, 7). At this time, a Gap Start (GS) event is triggered and the detector enters a Gap State. In the exemplary scenario of FIG. 7, no subsequent watermark are detected for a predetermined period of time, causing a Watermark Segment End (WSE) event and transitioning the detector to an Unmarked Content State. Upon detection of the next watermark that conforms to the expected numbering scheme of the previously detected watermarks (e.g., watermark #20 in FIG. 7), a Watermark Segment Start (WSS) event is triggered and the detector transitions back to the Marked Content State. It should be noted that pausing the content cause content degradation that result in a failure to detect one or more watermarks. In the pause example scenario of FIG. 7, only one watermark (i.e., watermark #19) is not detected. However, in some scenarios, a pause can affect more than one watermarks.

Figure 8:
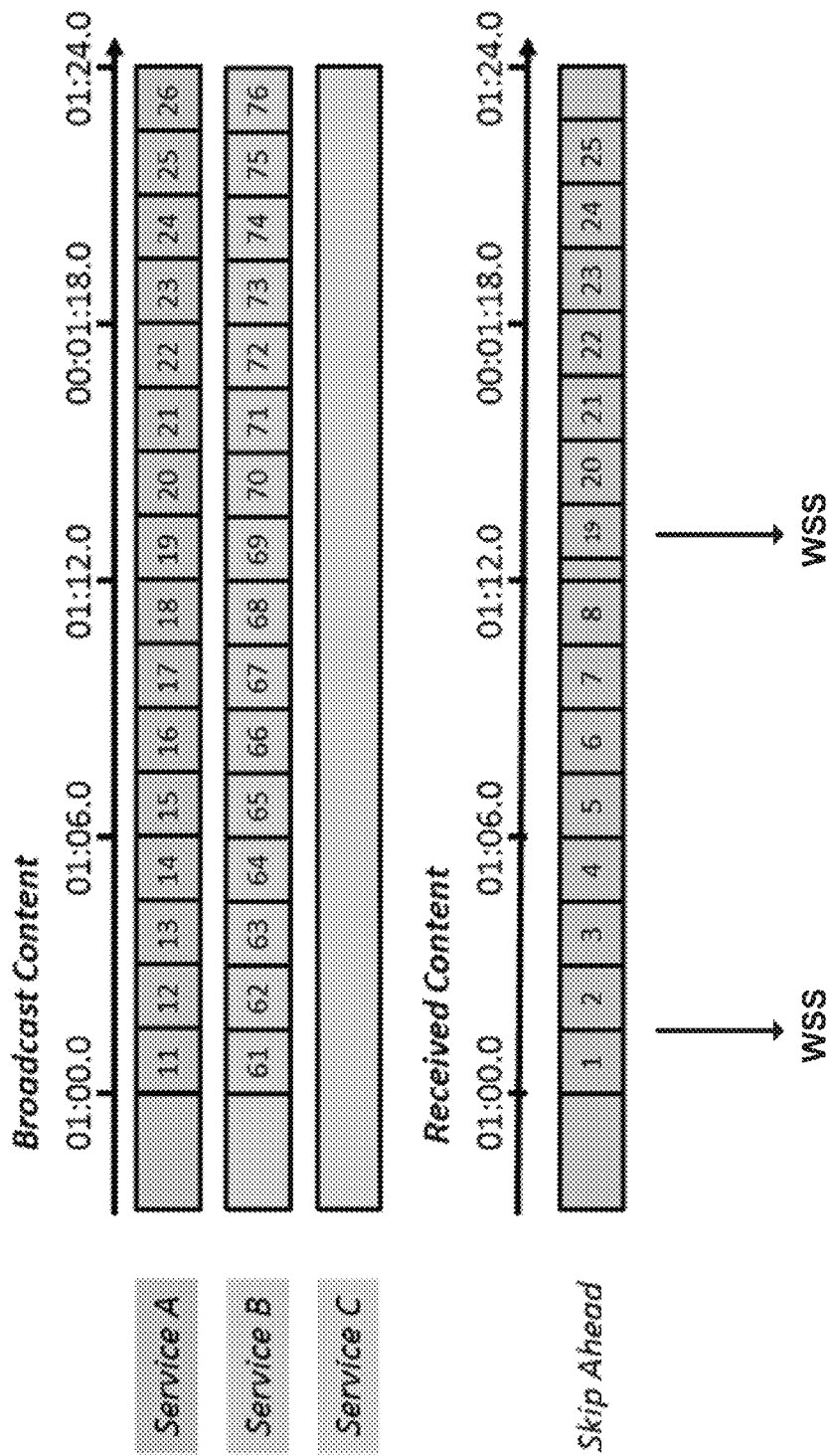
FIG. 8 is a simplified diagram of a content timeline and detected watermarks associated with a skip ahead operation.

FIG. 8 is a simplified diagram of a content's timeline associated with a skip ahead operation, Upon detection of the initial watermark(s), the detector enters a Marked Content State caused by a Watermark Segment Start (WSS) event. The Marked Content State persists until the detector detects a discontinuous watermark code that corresponds to a watermark that is expected to occur at a future location within the content. In the example, skip ahead scenario of FIG. 8, detection of watermark #8 is followed by the detection of watermark #19, which indicates approximately 10 watermarks are skipped. It should be noted that watermark #8 and/or watermark #9 may be detected using prediction techniques based on only partial watermark segments (as for example shown by smaller font size of watermark #19). Upon detection of the discontinuous watermarks, a Watermark Segment Start (WSS) event is triggered but the detector remains in the Marked Content State.

Figure 9:
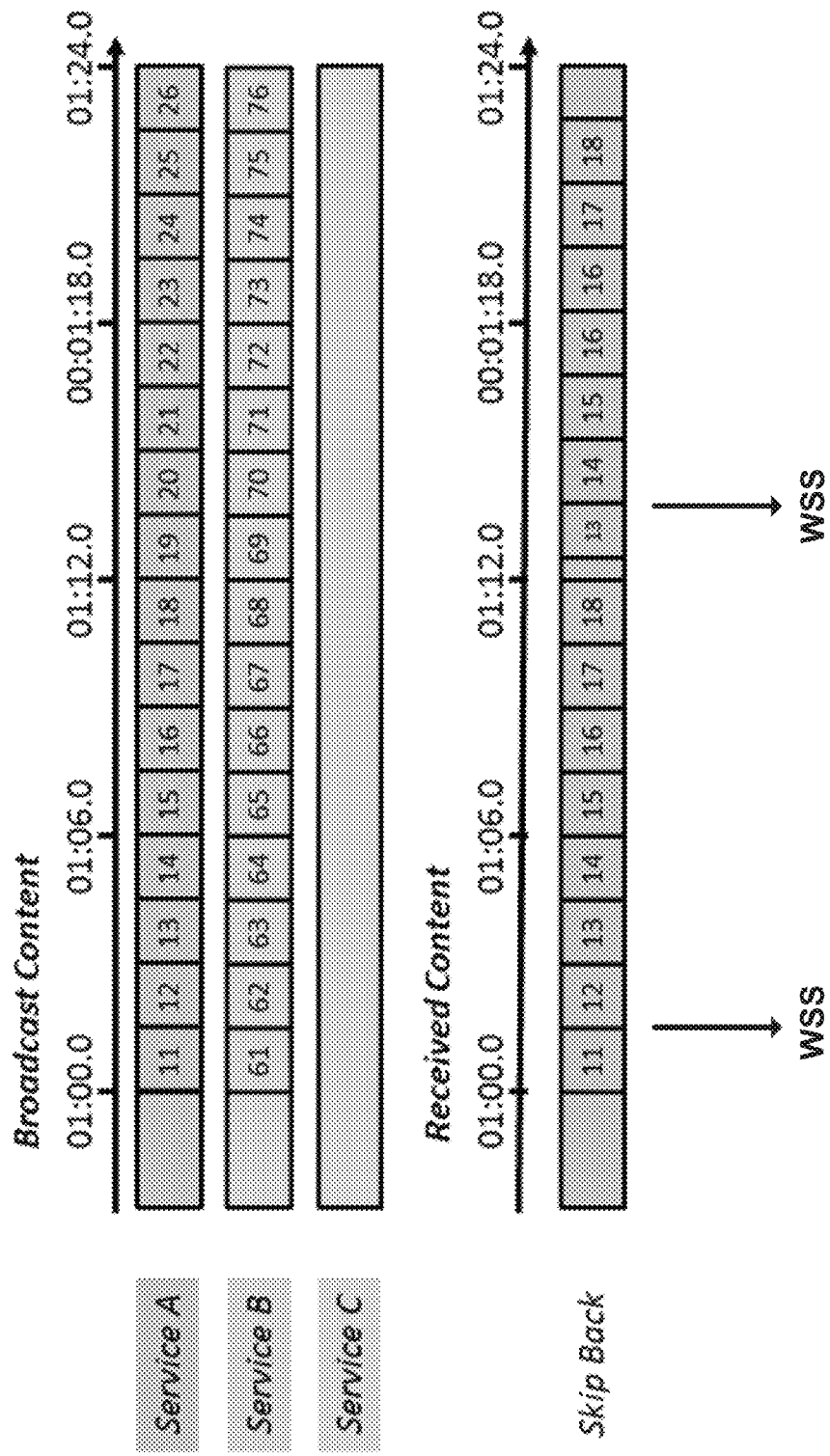
FIG. 9 is a simplified diagram of a content timeline and detected watermarks associated with a skip back operation.

FIG. 9 is a simplified diagram of a content's timeline associated with a skip back operation. Upon detection of the initial watermark(s), the detector enters a Marked Content State caused by a Watermark Segment Start (WSS) event. The Marked Content State persists until the detector detects a discontinuous watermark code that corresponds to a watermark that is expected to occur at a previous location within the content. In the example, skip ahead scenario of FIG. 9, detection of watermark #18 is followed by the detection of watermark #13 which indicates the content has been skipped backward for a length equal to approximately 5 watermarks. Similar to the case with a skip forward operation, watermarks that reside at the boundary of the skip location (e.g., watermarks #18 and/or #13 in FIG. 9) may be detected using prediction techniques based on only partial watermark segments (as for example shown by smaller font size of watermark #13). Upon detection of the discontinuous watermarks, a Watermark Segment Start (WSS) event is triggered but the detector remains in the Marked Content State.

It is evident from the examples of FIGS. 4-9 that various watermark detector states, detected events, in conjunction with the detected watermark values and/or patterns, as well as indication of low content activity can be used to distinguish various user actions, which allows subsequent presentation or access to additional materials that is suited to the corresponding action. For example, determination of a proper watermark start state can cause a query to the appropriate web server to access the metadata and to, for example, enable presentation of a secondary content or service.

One aspect of the disclosed technology relates to a method of distinguishing between pre-existing gaps and gaps caused by user actions in content received by a receiver that includes embedding a watermark content using a dither signal such that gaps in the content will include the dither signal, and detecting a watermark in a portion of the content having a gap, the content being in a state subsequent to a possible gap-generating user action. This method also includes predicting an expected watermark bit stream in the gap portion, comparing the detected with the predicted bit stream to determine if the detected bit stream matches the predicted bit stream, and if a match within a predetermined error tolerance exists, then indicating that the gap existed prior to any user-action.

FIG. 10 illustrates a set of operations that can be carried out to enable access to metadata associated with a primary content in accordance with an exemplary embodiment. At 1002, a plurality of watermark messages are extracted from the primary content to produce an indication as to a state of the watermark detector. The watermark extraction is carried out by processing digital samples of the primary content using a watermark extractor that it implemented at least partially in electronic circuits, and one or more of the plurality of watermark messages includes information that identifies a resource on a remote server to retrieve metadata associated with a section of the primary content. The state of the watermark extractor includes one the following states: (a) an unmarked content state indicating that at least a first section of the primary content that is processed by the watermark extractor does not include detected watermarks messages, (b) a marked content state indicating that at least a second section of the primary content that is processed by the watermark extractor includes one or more embedded watermark messages or parts thereof, or (c) a gap state indicating hat at least a third section of the primary content that is processed by the watermark extractor immediately subsequent to the second section of the primary content does not include watermark messages or parts thereof.

In the above method. the watermark extractor transitions from a one state to another state upon occurrence of an event that is based on one or more of: (1) failure to detect a watermark message, or part thereof, subsequent to detection of at least one watermark message, (2) detection of a watermark message, or part thereof, subsequent to a. failure to detect at least one watermark message, (3) detection of a section of the primary content with low activity, or (4) failure to detect embedded watermark messages for a predetermined interval of time. Referring back to FIG. 10, at 1004, using the one or more events or pattern of events the metadata associated with the primary content, or a use of such metadata is modified.

In one exemplary embodiment, modifying the use of the metadata includes modifying presentation of a secondary content that is associated with the primary content. In some embodiments, the information included in the one or more of the plurality of watermark messages includes a server code and an interval code. In one exemplary embodiment, upon initialization of the device or the watermark extractor, the watermark extractor enters the unmarked content state. In another exemplary embodiment, the watermark extractor remains in the marked content state upon occurrence of an event that is based on detection of a change in value of a watermark message extracted from the primary content in comparison with a value of a previously detected watermark message from the primary content. In yet another exemplary embodiment, the third section of the primary content has low content activity. For example, such a content section with low activity can have amplitude or energy values that are zero or are below corresponding predefined threshold values. In still another exemplary embodiment, while the watermark extractor is in the unmarked content state, detection of a watermark message signals a watermark start segment event that causes the watermark extractor to transition to the marked content state.

In another exemplary embodiment, at least one of the plurality of watermark messages extracted by the watermark extractor includes a trigger field that indicates a change in the metadata associated with the primary content, and, while the watermark extractor is in the marked content state, detection of a watermark message having the trigger field with a particular value or status signals a trigger event that causes the watermark extractor to remain in the marked content state. According to one embodiment, while the watermark extractor is in the marked content state, detection of a watermark message with a value that does not conform to an expected value signals a watermark start segment event that causes the watermark extractor to remain in the marked content state. For example, the expected value can be determined based on a value of a previously detected watermark message. In some embodiments, the value of the watermark message that does not conform to the expected value includes an interval code value that does not conform to an expected change in an interval code value of a previously detected watermark message. In some embodiments, the value of the watermark message that does not conform to the expected value includes a server code value that is different from a previously detected server code value.

According to one exemplary embodiment, while the watermark extractor is in the marked content state, failure to detect a watermark message that is accompanied by an indication of low content activity signals a gap start event that causes the watermark extractor to transition to the gap state. In some embodiments, the indication of low content activity is obtained by processing the primary content to detect amplitude or energy values associated with the primary content that are below corresponding predefined threshold values. In another exemplary embodiment, while the watermark extractor is in the marked content state, failure to detect a watermark message that is not accompanied by an indication of low content activity signals a watermark segment end event that causes the watermark extractor to transition to the unmarked content state.

In another exemplary embodiment, while the watermark extractor is in the gap state, failure to detect a watermark message that is not accompanied by an indication of low content activity signals a gap end event that causes the watermark extractor to transition to the marked content state. In yet another exemplary embodiment, while the watermark extractor is in the gap state, detection of a watermark message signals a gap end event that causes the watermark extractor to transition to the marked content state. According to another exemplary embodiment, while the watermark extractor is in the gap state, failure to detect a watermark message for a predetermined period of time that is not accompanied by an indication of low content activity signals a gap end event that causes the watermark extractor to transition to the unmarked content state.

In some embodiments, the above noted method for to enable access to metadata also includes identifying a particular interruption in presentation of the primary content based on occurrence of one or more events and one or more states of the watermark extractor. In one exemplary embodiment, the particular interruption is a change in a source of the primary content that is identified by a first transition of the watermark extractor from the marked content state to the gap state, followed by a second transition from the gap state to the marked content state and a third transition from the marked content state to the unmarked content state. In another exemplary embodiment, the particular interruption is a pause in presentation of the primary content that is identified by a first transition of the watermark extractor from the marked content state to the gap state, followed by a second transition from the gap state to the marked content state, a third transition from the marked content state to the unmarked content state and a fourth transition to the unmarked content state to the marked content state. In this embodiment, tine fourth transition is based on detection of a watermark value that is expected to occur immediately prior to the first transition.

According to another exemplary embodiment, the particular interruption is a skip forward to another section of the primary content that is identified by a watermark value, while the watermark extractor is in the marked content state, that is expected to occur at a future location within the primary content. In yet another exemplary embodiment, the particular interruption is a skip back to another section of the primary content that is identified by a watermark value, while the watermark extractor is in the marked content state, that is expected to occur at a previous location within the primary content. In still another exemplary embodiment, while the watermark extractor is in the marked content state, detection of a watermark message based on a watermark prediction technique that is accompanied by detection of the section of the primary content with low activity causes the watermark extractor to remain in the marked content state.

Another aspect of the disclosed embodiments relates to a computer program product, embodied on one or more non-transitory computer readable media, that includes program code for processing digital samples of a primary content using a watermark extractor that it implemented at least partially in electronic circuits to extract a plurality of watermark messages from the primary content and to produce an indication as to a state of the watermark detector. The one or more of the plurality of watermark messages include information that identifies a resource on a remote server to retrieve metadata associated with a section of the primary content, and the state of the watermark extractor includes one the following states: (a) an unmarked content state indicating that at least a first section of the primary content that is processed by the watermark extractor does not include detected watermarks messages, (b) a marked content state indicating that at least a second section of the primary content that is processed by the watermark extractor includes one or more embedded watermark messages or parts thereof, or (c) a gap state indicating that at least a third section of the primary content that is processed by the watermark extractor immediately subsequent to the second section of the primary content does not include watermark messages or parts thereof. The watermark extractor transitions from a one state to another state upon occurrence of an event that is based on one or more of: (1) failure to detect a watermark message, or part thereof, subsequent to detection of at least one watermark message, (2) detection of a watermark message, or part thereof, subsequent to a failure to detect at least one watermark message, (3) detection of a section of the primary content with low activity, or (4) failure to detect embedded watermark messages for a predetermined interval of time. The above noted computer program product further includes program code for using the one or more events or pattern of events to retrieve the metadata or modify a use of the metadata.

Figure 11:
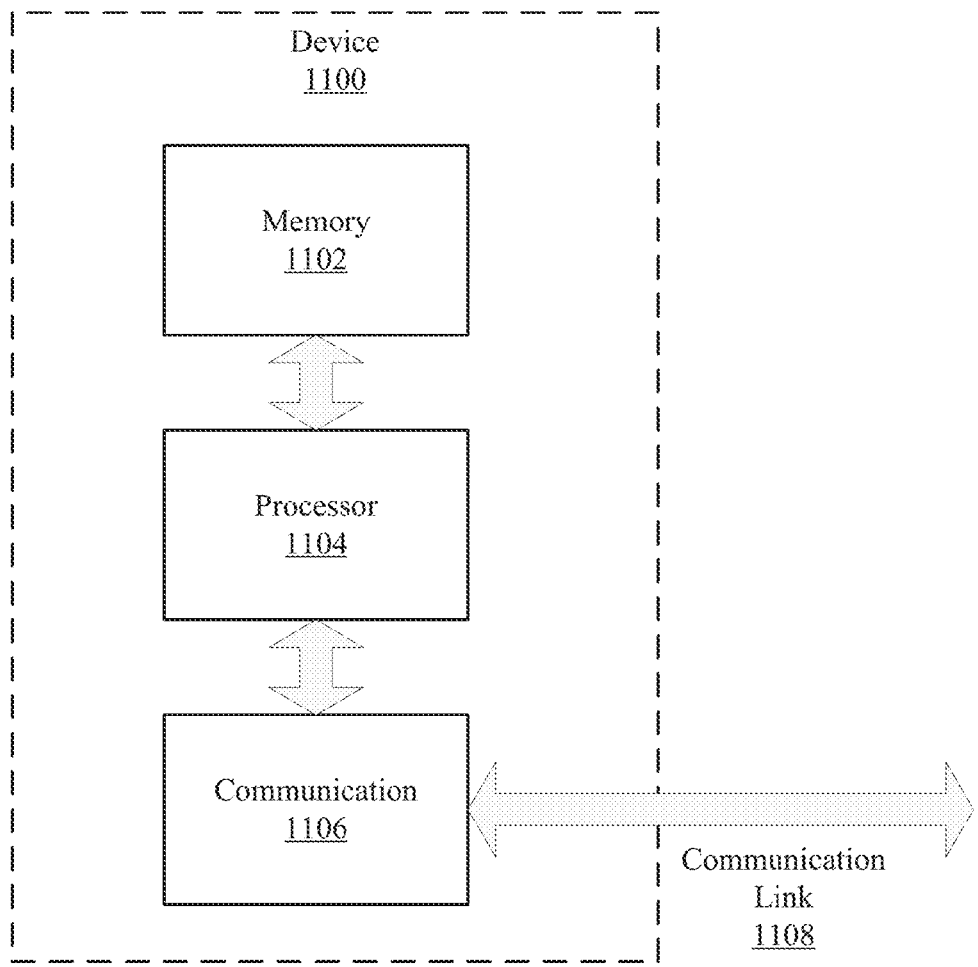
FIG. 11 illustrates a block diagram of a device that can be used for implementing various disclosed embodiments.

FIG. 11 illustrates a block diagram of a device 1100 within which various disclosed embodiments my be implemented. The device 1100 comprises at least one processor 1104 and/or controller, at least one memory 1102 unit that is in communication with the processor 1104, and at least one communication unit 1106 that enables the exchange of data and information, directly or indirectly, through the communication link 1108 with other entities, devices, databases and networks. The communication unit 1106 may provide wired and/or wireless communication capabilities in accordance with one or more communication protocols, and therefore it may comprise the proper transmitter/receiver, antennas, circuitry and ports, as well as the encoding/decoding capabilities that may be necessary for proper transmission and/or reception of data and other information. The exemplary device 1100 of FIG. 11 may be integrated as part of any devices or components described in this document to carry out any of the disclosed methods.

The components or modules that are described in connection with the disclosed embodiments can be implemented as hardware, software, or combinations thereof. For example, a hardware implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application.

Various embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), Blu-ray Discs, etc. Therefore, the computer-readable media described in the present application include non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

For example, one aspect of the disclosed embodiments relates to a computer program product that is embodied on a non-transitory computer readable medium. The computer program product includes program code for carrying out any one or and/or all of the operations of the disclosed embodiments.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products, as well as in different sequential orders, Any embodiment may further be combined with any other embodiment.

What is claimed is:

1. A device comprising:
  a processor; and
  a memory including processor executable code, the processor executable code, when executed by the processor, causes the device to:
  receive a primary content;
  extract a plurality of watermark messages from the primary content using a watermark extractor, wherein extraction of the plurality of watermark messages includes processing digital samples of the primary content to obtain watermark symbols that are embedded imperceptibly therein and to produce an indication as to a state of the watermark extractor, wherein one or more of the plurality of watermark messages include information that identifies a resource on a remote server to retrieve metadata associated with a section of the primary content, and the state of the watermark extractor includes one the following states:
    (a) an unmarked content state indicating that at least a first section of the primary content that is processed by the watermark extractor does not include detected watermarks messages,
    (b) a marked content state indicating that at least a second section of the primary content that is processed by the watermark extractor includes one or more embedded watermark messages or parts thereof, or
    (c) a gap state indicating that at least a third section of the primary content that is processed by the watermark extractor immediately subsequent to the second section of the primary content does not include watermark messages or parts thereof, and
  the memory including processor executable code, the processor executable code, when executed by the processor further causes the watermark extractor to transition from a one state to another state upon occurrence of an event that is based on one or more of: (1) failure to detect a watermark message, or part thereof, subsequent to detection of at least one watermark message, (2) detection of a watermark message, or part thereof, subsequent to a failure to detect at least one watermark message, (3) detection of a section of the primary content with low activity, or (4) failure to detect embedded watermark messages for a predetermined interval of time, and
  wherein retrieval of the metadata is enabled, or use of the metadata is modified, based one or more events or pattern of events.

2. The device of claim 1, wherein the information included in the one or more of the plurality of watermark messages includes a server code and an interval code.

3. The device of claim 1, wherein, upon initialization of the device or the watermark extractor, the watermark extractor enters the unmarked content state.

4. The device of claim 1, wherein the watermark extractor remains in the marked content state upon occurrence of an event that is based on detection of a change in value of a watermark message extracted from the primary content in comparison with a value of a previously detected watermark message from the primary content.

5. The device of claim 1, wherein the third section of the primary content has low content activity.

6. The device of claim 5, wherein amplitude or energy values of the third section are zero or are below corresponding predefined threshold values.

7. The device of claim 1, wherein, while the watermark extractor is in the unmarked content state, detection of a watermark message signals a watermark start segment event that causes the watermark extractor to transition to the marked content state.

8. The device of claim 1, wherein at least one of the plurality of watermark messages extracted by the watermark extractor includes a trigger field that indicates a change in the metadata associated with the primary content, and, while the watermark extractor is in the marked content state, detection of a watermark message having the trigger field with a particular value or status signals a trigger event that causes the watermark extractor to remain in the marked content state.

9. The device of claim 1, wherein, while the watermark extractor is in the marked content state, detection of a watermark message with a value that does not conform to an expected value signals a watermark start segment event that causes the watermark extractor to remain in the marked content state.

10. The device of claim 9, wherein the expected value is determined based on a value of a previously detected watermark message.

11. The device of claim 9, wherein the value of the watermark message that does not conform to the expected value includes an interval code value that does not conform to an expected change in an interval code value of a previously detected watermark message.

12. The device of claim 9, wherein the value of the watermark message that does not conform to the expected value includes a server code value that is different from a previously detected server code value.

13. The device of claim 1, wherein, while the watermark extractor is in the marked content state, failure to detect a watermark message that is accompanied by an indication of low content activity signals a gap start event that causes the watermark extractor to transition to the gap state.

14. The device of claim 13, wherein the indication of low content activity is obtained by processing the primary content to detect amplitude or energy values associated with the primary content that are below corresponding predefined threshold values.

15. The device of claim 1, wherein, while the watermark extractor is in the marked content state, failure to detect a watermark message that is not accompanied by an indication of low content activity signals a watermark segment end event that causes the watermark extractor to transition to the unmarked content state.

16. The device of claim 1, wherein, while the watermark extractor is in the gap state, failure to detect a watermark message that is not accompanied by an indication of low content activity signals a gap end event that causes the watermark extractor to transition to the marked content state.

17. The device of claim 1, wherein, while the watermark extractor is in the gap state, detection of a watermark message signals a gap end event that causes the watermark extractor to transition to the marked content state.

18. The device of claim 1, wherein, while the watermark extractor is in the gap state, failure to detect a watermark message for a predetermined period of time that is not accompanied by an indication of low content activity signals a gap end event that causes the watermark extractor to transition to the unmarked content state.

19. The device of claim 1, wherein one or more states of the watermark extractor and the occurrence of one or more events allow identification of a particular interruption in presentation of the primary content.

20. The device of claim 19, wherein the particular interruption is a change in a source of the primary content that is identified by:
a first transition of the watermark extractor from the marked content state to the gap state, followed a second transition from the gap state to the marked content state and a third transition from the marked content state to the unmarked content state.

21. The device of claim 19, wherein the particular interruption is a pause in presentation of the primary content that is identified by:
a first transition of the watermark extractor from the marked content state to the gap state, followed by a second transition from the gap state to the marked content state, a third transition from the marked content state to the unmarked content state and a fourth transition to the unmarked content state to the marked content state,
wherein the fourth transition is based on detection of a watermark value that is expected to occur immediately prior to the first transition.

22. The device of claim 19, wherein the particular interruption is a skip forward to another section of the primary content that is identified by:
a watermark value, while the watermark extractor is in the marked content state, that is expected to occur at a future location within the primary content.

23. The device of claim 19, wherein the particular interruption is a skip back to another section of the primary content that is identified by:
a watermark value, while the watermark extractor is in the marked content state, that is expected to occur at a previous location within the primary content.

24. The device of claim 1, wherein, while the watermark extractor is in the marked content state, detection of a watermark message based on a watermark prediction technique that is accompanied by detection of the section of the primary content with low activity causes the watermark extractor to remain in the marked content state.

25. The device of claim 1, wherein the device is implemented as part of a mobile device.

26. The device of claim 1, wherein the device is implemented as part of a consumer electronic device that is coupled to a television set.

27. A method for enabling access to metadata associated with a primary content, comprising:
receiving a primary content
extracting a plurality of watermark messages from the primary content using a watermark extractor that it implemented at least partially in electronic circuits, wherein extracting the plurality of watermark messages includes processing digital samples of the primary content to obtain watermark symbols that are embedded imperceptibly therein, and based on the extracted watermark messages producing an indication as to a state of the watermark detector, wherein one or more of the plurality of watermark messages include information that identifies a resource on a remote server to retrieve metadata associated with a section of the primary content, and the state of the watermark extractor includes one the following states:
(a) an unmarked content state indicating that at least a first section of the primary content that is processed by the watermark extractor does not include detected watermarks messages,
(b) a marked content state indicating that at least a second section of the primary content that is processed by the watermark extractor includes one or more embedded watermark messages or parts thereof, or
(c) a gap state indicating that at least a third section of the primary content that is processed by the watermark extractor immediately subsequent to the second section of the primary content does not include watermark messages or parts thereof,
wherein the watermark extractor transitions from a one state to another state upon occurrence of an event that is based on one or more of: (1) failure to detect a watermark message, or part thereof, subsequent to detection of at least one watermark message, (2) detection of a watermark message, or part thereof, subsequent to a failure to detect at least one watermark message, (3) detection of a section of the primary content with low activity, or (4) failure to detect embedded watermark messages for a predetermined interval of time; and using the one or more events or pattern of events to retrieve the metadata or modify a use of the metadata.

28. The method of claim 27, wherein the information included in the one or more of the plurality of watermark messages includes a server code and an interval code.

29. The method of claim 27, wherein, upon initialization of the device or the watermark extractor, the watermark extractor enters the unmarked content state.

30. The method of claim 27, wherein the watermark extractor remains in the marked content state upon occurrence of an event that is based on detection of a change in value of a watermark message extracted from the primary content in comparison with a value of a previously detected watermark message from the primary content.

31. The method of claim 27, wherein the third section of the primary content has low content activity.

32. The method of claim 31, wherein amplitude or energy values of the third section are zero or are below corresponding predefined threshold values.

33. The method of claim 27, wherein, while the watermark extractor is in the unmarked content state, detection of a watermark message signals a watermark start segment event that causes the watermark extractor to transition to the marked content state.

34. The method of claim 27, wherein at least one of the plurality of watermark messages extracted by the watermark extractor includes a trigger field that indicates a change in the metadata associated with the primary content, and, while the watermark extractor is in the marked content state, detection of a watermark message having the trigger field with a particular value or status signals a trigger event that causes the watermark extractor to remain in the marked content state.

35. The method of claim 27, wherein, while the watermark extractor is in the marked content state, detection of a watermark message with a value that does not conform to an expected value signals a watermark start segment event that causes the watermark extractor to remain in the marked content state.

36. The method of claim 35, wherein the expected value is determined based on a value of a previously detected watermark message.

37. The method of claim 35, wherein the value of the watermark message that does not conform to the expected value includes an interval code value that does not conform to an expected change in an interval code value of a previously detected watermark message.

38. The method of claim 35, wherein the value of the watermark message that does not conform to the expected value includes a server code value that is different from a previously detected server code value.

39. The method of claim 27, wherein, while the watermark extractor is in the marked content state, failure to detect a watermark message that is accompanied by an indication of low content activity signals a gap start event that causes the watermark extractor to transition to the gap state.

40. The method of claim 39, wherein the indication of low content activity is obtained by processing the primary content to detect amplitude or energy values associated with the primary content that are below corresponding predefined threshold values.

41. The method of claim 27, wherein, while the watermark extractor is in the marked content state, failure to detect a watermark message that is not accompanied by an indication of low content activity signals a watermark segment end event that causes the watermark extractor to transition to the unmarked content state.

42. The method of claim 27, wherein, while the watermark extractor is in the gap state, failure to detect a watermark message that is not accompanied by an indication of low content activity signals a gap end event that causes the watermark extractor to transition to the marked content state.

43. The method of claim 27, wherein, while the watermark extractor is in the gap state, detection of a watermark message signals a gap end event that causes the watermark extractor to transition to the marked content state.

44. The method of claim 27, wherein, while the watermark extractor is in the gap state, failure to detect a watermark message for a predetermined period of time that is not accompanied by an indication of low content activity signals a gap end event that causes the watermark extractor to transition to the unmarked content state.

45. The method of claim 27, further comprising identifying a particular interruption in presentation of the primary content based on occurrence of one or more events and one or more states of the watermark extractor.

46. The method of claim 45, wherein the particular interruption is a change in a source of the primary content that is identified by:
a first transition of the watermark extractor from the marked content state to the gap state, followed a second transition from the gap state to the marked content state and a third transition from the marked content state to the unmarked content state.

47. The method of claim 45, wherein the particular interruption is a pause in presentation of the primary content that is identified by:
a first transition of the watermark extractor from the marked content state to the gap state, followed by a second transition from the gap state to the marked content state, a third transition from the marked content state to the unmarked content state and a fourth transition to the unmarked content state to the marked content state,
wherein the fourth transition is based on detection of a watermark value that is expected to occur immediately prior to the first transition.

48. The method of claim 45, wherein the particular interruption is a skip forward to another section of the primary content that is identified by:
a watermark value, while the watermark extractor is in the marked content state, that is expected to occur at a future location within the primary content.

49. The method of claim 45, wherein the particular interruption is a skip back to another section of the primary content that is identified by:
a watermark value, while the watermark extractor is in the marked content state, that is expected to occur at a previous location within the primary content.

50. The method of claim 27, wherein, while the watermark extractor is in the marked content state, detection of a watermark message based on a watermark prediction technique that is accompanied by detection of the section of the primary content with low activity causes the watermark extractor to remain in the marked content state.

51. The method of claim 27, wherein modifying the use of the metadata includes modifying presentation of a secondary content that is associated with the primary content.

52. A computer program product, embodied on one or more non-transitory computer readable media, comprising:
program code for receiving a primary content;
program code for using a watermark extractor extracting a plurality of watermark messages from the primary content, wherein extracting the plurality of watermark messages includes processing digital samples of the primary content to obtain watermark symbols that are embedded imperceptibly therein, and to produce an indication as to a state of the watermark detector, wherein one or more of the plurality of watermark messages include information that identifies a resource on a remote server to retrieve metadata associated with a section of the primary content, and the state of the watermark extractor includes one the following states:
(a) an unmarked content state indicating that at least a first section of the primary content that is processed by the watermark extractor does not include detected watermarks messages,
(b) a marked content state indicating that at least a second section of the primary content that is processed by the watermark extractor includes one or more embedded watermark messages or parts thereof, or
(c) a gap state indicating that at least a third section of the primary content that is processed by the watermark extractor immediately subsequent to the second section of the primary content does not include watermark messages or parts thereof,
wherein the watermark extractor transitions from a one state to another state upon occurrence of an event that is based on one or more of: (1) failure to detect a watermark message, or part thereof, subsequent to detection of at least one watermark message, (2) detection of a watermark message, or part thereof, subsequent to a failure to detect at least one watermark message, (3) detection of a section of the primary content with low activity, or (4) failure to detect embedded watermark messages for a predetermined interval of time; and program code for using the one or more events or pattern of events to retrieve the metadata or modify a use of the metadata.

* * * * *